(12) United States Patent
　　Esswie

(10) Patent No.:　US 12,627,740 B2
(45) Date of Patent:　May 12, 2026

(54) SERVICE-AWARE QUANTIZATION OF EXTENDED-REALITY HAPTIC CONTROL INFORMATION

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 18/777,229

(22) Filed: Jul. 18, 2024

(65) Prior Publication Data

US 2026/0025434 A1　　Jan. 22, 2026

(51) Int. Cl.
　　*G06F 15/16*　　　(2006.01)
　　*G06F 3/01*　　　(2006.01)
　　*H04L 67/131*　　(2022.01)
(52) U.S. Cl.
　　CPC ............ *H04L 67/131* (2022.05); *G06F 3/017* (2013.01)
(58) Field of Classification Search
　　CPC ............................... H04L 67/131; G06F 3/017
　　USPC ........................................................ 709/218
　　See application file for complete search history.

(56) References Cited

U.S. PATENT DOCUMENTS

| | | | | |
|---|---|---|---|---|
| 11,480,791 | B2 * | 10/2022 | Berliner | .............. G06K 7/1417 |
| 11,481,963 | B2 * | 10/2022 | Berliner | ............. G02B 27/0093 |
| 11,496,571 | B2 * | 11/2022 | Berliner | .................... G06T 7/70 |
| 11,588,897 | B2 * | 2/2023 | Berliner | .............. H04L 65/4015 |
| 11,627,172 | B2 * | 4/2023 | Berliner | .......... H04M 1/724097 |
| | | | | 709/204 |
| 12,001,608 | B2 | 6/2024 | Eagleman | |
| 12,007,561 | B2 | 6/2024 | Phillips | |
| 12,177,911 | B2 * | 12/2024 | Xue | ........................ H04L 65/70 |
| 12,198,427 | B2 | 1/2025 | Zhang | |

(Continued)

OTHER PUBLICATIONS

Esswie, Ali. "Dynamic Compression of Extended-Reality Haptic Traffic" U.S. Appl. No. 18/777,212, filed Jul. 18, 2024, 89 pages.

(Continued)

*Primary Examiner* — Moustafa M Meky

(74) *Attorney, Agent, or Firm* — Amin, Turocy & Watson, LLP

(57)　　　ABSTRACT

A radio network node generates, and transmits to an extended reality processing unit, extended reality haptic experience quantization configuration information that is based on possible haptic experiences determined by an extended reality server that may facilitate an extended reality session with one or more extended reality appliance(s) communicatively coupled with the processing unit. The processing unit quantizes haptic experience information, indicative of haptic action(s), generated by and received from the appliance(s), based on the quantization configuration information and transmits a quantized indication of the haptic action(s) to the node. The node forwards, to the processing unit, reactive traffic generated by the server in response to the indicated haptic action(s). The processing unit distributes the indicated haptic experience to the appliance(s) that experienced the haptic action to which the reactive corresponds. A message that comprises the quantized indication and the reactive traffic do not comprise identifier(s) indicative of the appliance(s).

20 Claims, 18 Drawing Sheets

(56) References Cited

U.S. PATENT DOCUMENTS

| | | | |
|---|---|---|---|
| 12,271,523 B2 | 4/2025 | Xu | |
| 12,444,144 B2 | 10/2025 | Jonker | |
| 2021/0058649 A1 | 2/2021 | Goldberg | |
| 2021/0373662 A1* | 12/2021 | Pratt | G06F 3/011 |
| 2021/0405736 A1* | 12/2021 | Zavesky | H04L 67/75 |
| 2022/0254096 A1* | 8/2022 | Berliner | G06T 7/70 |
| 2022/0254119 A1* | 8/2022 | Berliner | G06V 30/228 |
| 2022/0255974 A1* | 8/2022 | Berliner | G06K 7/1417 |
| 2022/0255995 A1 | 8/2022 | Berliner | |
| 2022/0286488 A1* | 9/2022 | Berliner | H04L 51/58 |
| 2022/0387885 A1 | 12/2022 | Sinai-Glazer | |
| 2022/0404620 A1 | 12/2022 | Phillips | |
| 2023/0010796 A1* | 1/2023 | Berliner | H04W 4/80 |
| 2023/0152880 A1 | 5/2023 | Soryal | |
| 2023/0316594 A1* | 10/2023 | Lai | G06F 9/453 |
| | | | 345/629 |
| 2023/0342677 A1* | 10/2023 | Desai | G06F 3/012 |
| 2024/0071013 A1* | 2/2024 | Jonker | G06F 3/0485 |
| 2024/0077986 A1* | 3/2024 | Santosa | G06V 20/20 |
| 2024/0078768 A1* | 3/2024 | Mahadevan | G06V 20/20 |
| 2024/0087238 A1* | 3/2024 | Cai | G06T 19/003 |
| 2024/0108985 A1 | 4/2024 | Terre | |
| 2024/0112408 A1 | 4/2024 | Berliner | |
| 2024/0144618 A1 | 5/2024 | Jonker | |
| 2024/0188090 A1 | 6/2024 | Elshafie | |
| 2024/0345396 A1 | 10/2024 | Phillips | |
| 2024/0427419 A1 | 12/2024 | Harviainen | |
| 2025/0039098 A1 | 1/2025 | Salah | |
| 2025/0203705 A1* | 6/2025 | Kanamarlapudi | |
| | | | H04W 28/0278 |
| 2025/0234239 A1* | 7/2025 | Hong | H04W 28/0268 |
| 2025/0306685 A1 | 10/2025 | Harviainen | |
| 2025/0338344 A1 | 10/2025 | Thiruvenkatachari | |
| 2025/0351100 A1* | 11/2025 | Kuo | H04W 28/0268 |
| 2025/0377727 A1 | 12/2025 | Fu | |
| 2025/0384596 A1* | 12/2025 | Lai | G06F 3/011 |

OTHER PUBLICATIONS

"3rd Generation Partnership Project; Technical Specification Group Services and System Aspects; Release 17 Description; Summary of Rel-17 Work Items (Release 17)" 3GPP TR 21.917 V17.0.1, Jan. 2023, 167 pages.

Notice of Allowance mailed Jan. 9, 2026 for U.S. Appl. No. 18/777,212, 27 pages.

* cited by examiner

300

XR device group application information

- Existing UCI/RRC information elements

310

XR device group application information

410 one or more end XR device IDs which are connected to the active XR session, and/or

415

XR application ID or profile ID

XR application profile information response

- Existing backhaul information elements

320 → XR application profile information response

510 → XR application support indication of haptic control inputs, and/or

515 → one or more possible XR application haptic control elements (e.g., right hand movement, left hand movements, up movement, down movement)

XR multi-device quantization XR haptic information

| Quantization value | Haptic experience combination (device 1, device 2) |
|---|---|
| 11 | (right, right) |
| 12 | (right, left) |
| 21 | (left, right) |
| 22 | (left, left) |

- Existing UCI/RRC information elements
- Aggregate multi-device haptic quantization value(s)
  Value "12"

335

705

800

Figure 9:
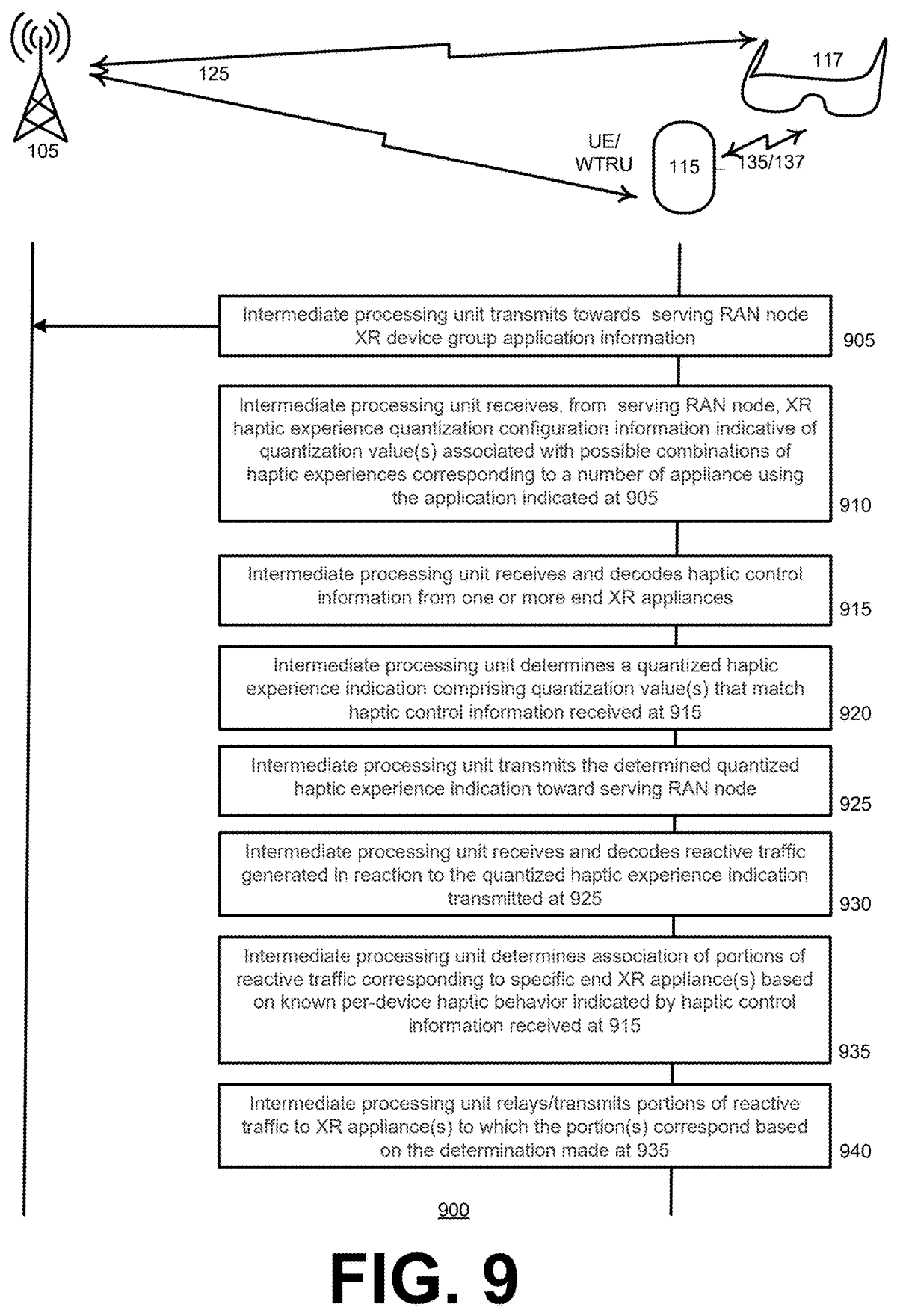

Intermediate processing unit transmits towards serving RAN node XR device group application information — 905

Intermediate processing unit receives, from serving RAN node, XR haptic experience quantization configuration information indicative of quantization value(s) associated with possible combinations of haptic experiences corresponding to a number of appliance using the application indicated at 905 — 910

Intermediate processing unit receives and decodes haptic control information from one or more end XR appliances — 915

Intermediate processing unit determines a quantized haptic experience indication comprising quantization value(s) that match haptic control information received at 915 — 920

Intermediate processing unit transmits the determined quantized haptic experience indication toward serving RAN node — 925

Intermediate processing unit receives and decodes reactive traffic generated in reaction to the quantized haptic experience indication transmitted at 925 — 930

Intermediate processing unit determines association of portions of reactive traffic corresponding to specific end XR appliance(s) based on known per-device haptic behavior indicated by haptic control information received at 915 — 935

Intermediate processing unit relays/transmits portions of reactive traffic to XR appliance(s) to which the portion(s) correspond based on the determination made at 935 — 940

Figure 11:
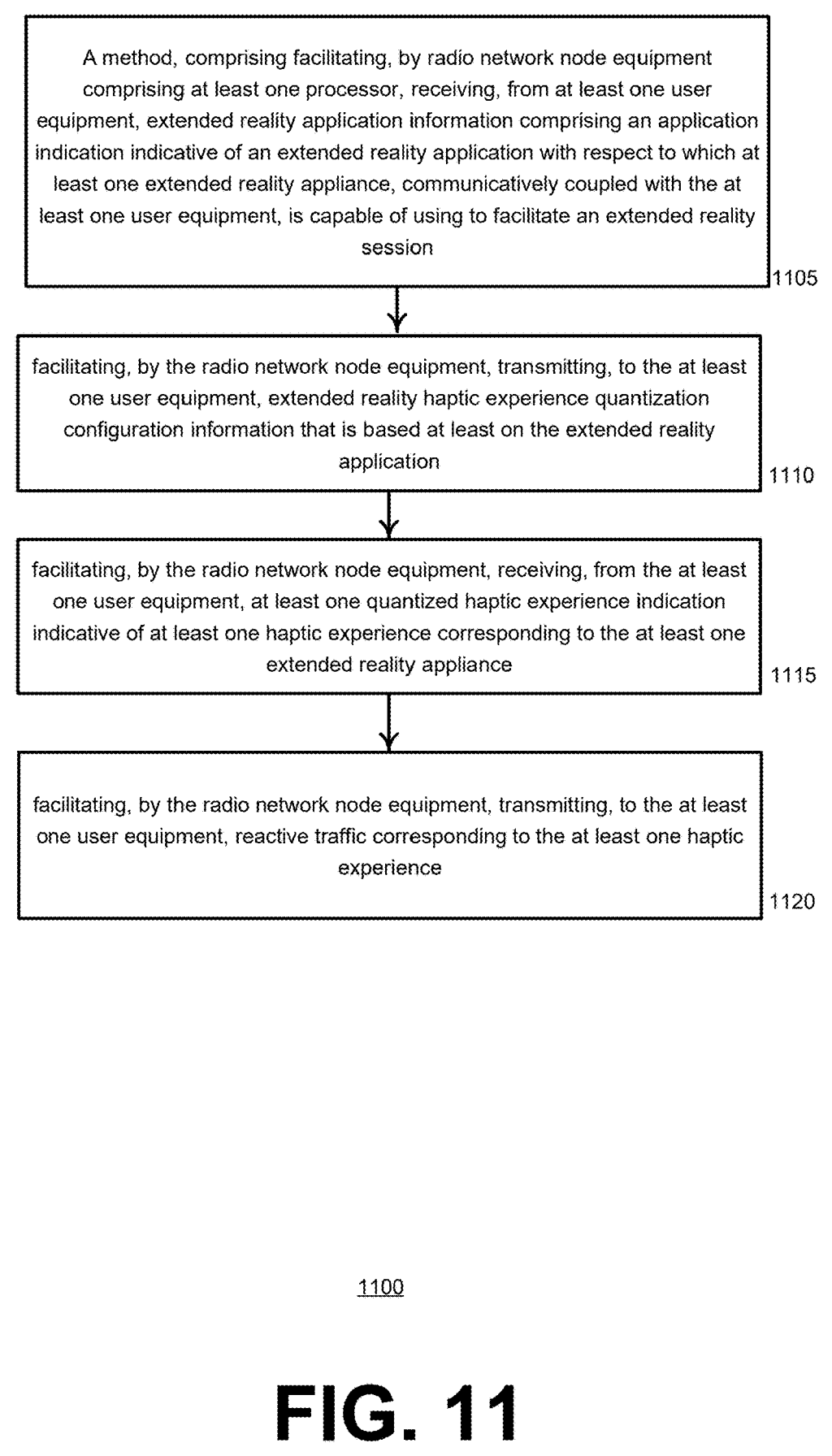

A method, comprising facilitating, by radio network node equipment comprising at least one processor, receiving, from at least one user equipment, extended reality application information comprising an application indication indicative of an extended reality application with respect to which at least one extended reality appliance, communicatively coupled with the at least one user equipment, is capable of using to facilitate an extended reality session

1105 facilitating, by the radio network node equipment, transmitting, to the at least one user equipment, extended reality haptic experience quantization configuration information that is based at least on the extended reality application

1110 facilitating, by the radio network node equipment, receiving, from the at least one user equipment, at least one quantized haptic experience indication indicative of at least one haptic experience corresponding to the at least one extended reality appliance

1115 facilitating, by the radio network node equipment, transmitting, to the at least one user equipment, reactive traffic corresponding to the at least one haptic experience

Figure 12:
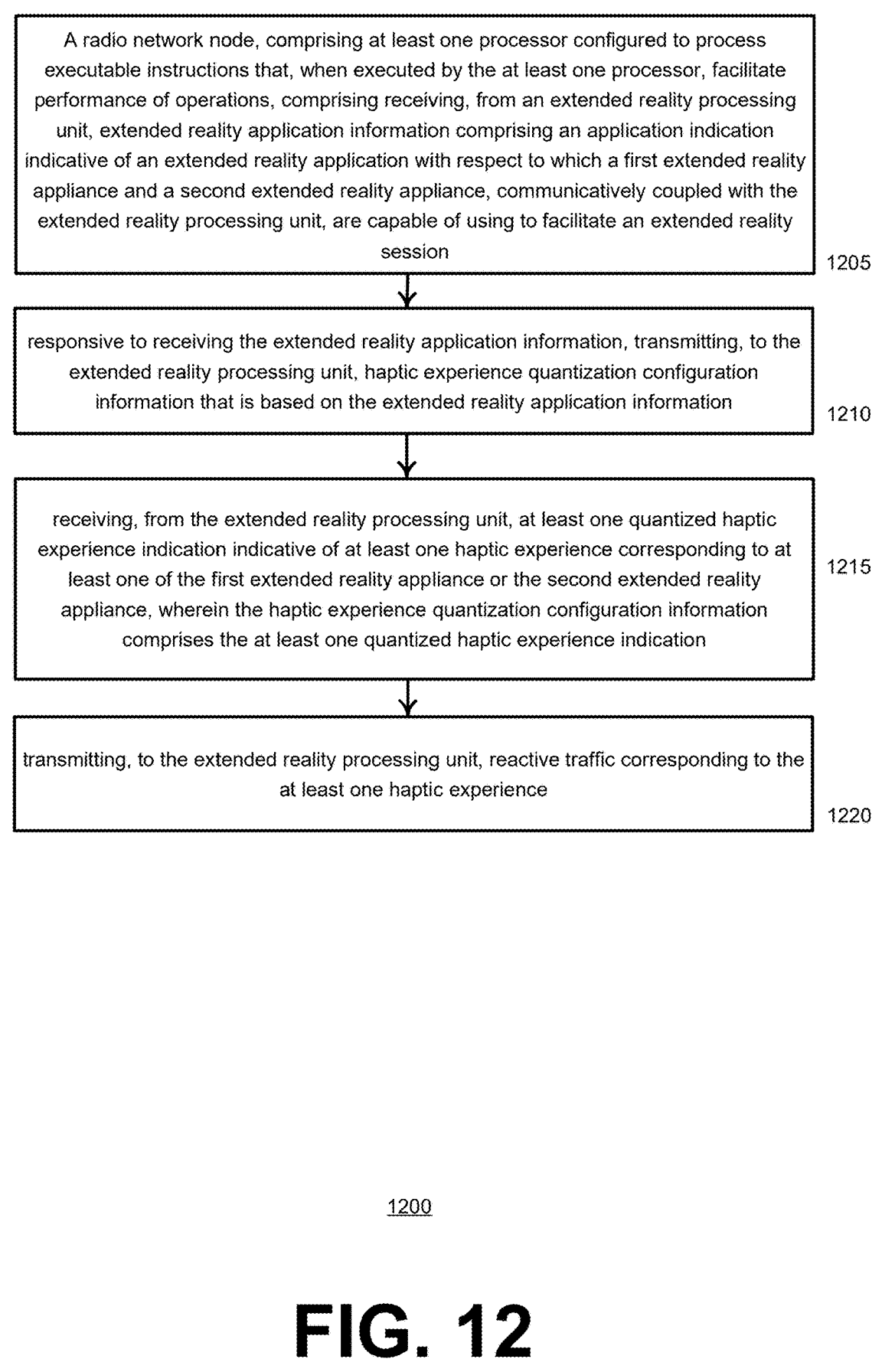

A radio network node, comprising at least one processor configured to process executable instructions that, when executed by the at least one processor, facilitate performance of operations, comprising receiving, from an extended reality processing unit, extended reality application information comprising an application indication indicative of an extended reality application with respect to which a first extended reality appliance and a second extended reality appliance, communicatively coupled with the extended reality processing unit, are capable of using to facilitate an extended reality session

1205 responsive to receiving the extended reality application information, transmitting, to the extended reality processing unit, haptic experience quantization configuration information that is based on the extended reality application information

1210 receiving, from the extended reality processing unit, at least one quantized haptic experience indication indicative of at least one haptic experience corresponding to at least one of the first extended reality appliance or the second extended reality appliance, wherein the haptic experience quantization configuration information comprises the at least one quantized haptic experience indication

1215 transmitting, to the extended reality processing unit, reactive traffic corresponding to the at least one haptic experience

Figure 13:
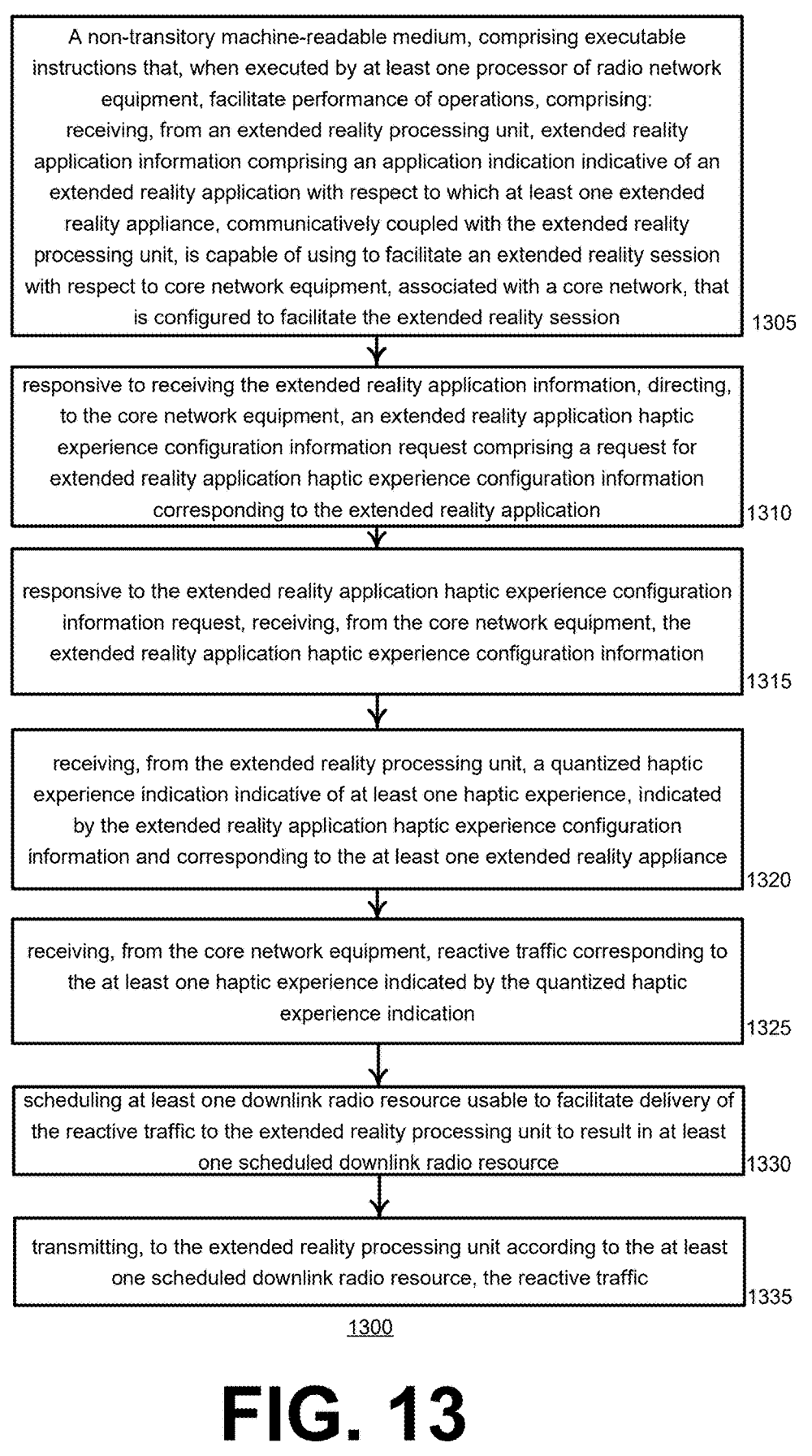

A non-transitory machine-readable medium, comprising executable instructions that, when executed by at least one processor of radio network equipment, facilitate performance of operations, comprising: receiving, from an extended reality processing unit, extended reality application information comprising an application indication indicative of an extended reality application with respect to which at least one extended reality appliance, communicatively coupled with the extended reality processing unit, is capable of using to facilitate an extended reality session with respect to core network equipment, associated with a core network, that is configured to facilitate the extended reality session

1305 responsive to receiving the extended reality application information, directing, to the core network equipment, an extended reality application haptic experience configuration information request comprising a request for extended reality application haptic experience configuration information corresponding to the extended reality application

1310 responsive to the extended reality application haptic experience configuration information request, receiving, from the core network equipment, the extended reality application haptic experience configuration information

1315 receiving, from the extended reality processing unit, a quantized haptic experience indication indicative of at least one haptic experience, indicated by the extended reality application haptic experience configuration information and corresponding to the at least one extended reality appliance

1320 receiving, from the core network equipment, reactive traffic corresponding to the at least one haptic experience indicated by the quantized haptic experience indication

1325 scheduling at least one downlink radio resource usable to facilitate delivery of the reactive traffic to the extended reality processing unit to result in at least one scheduled downlink radio resource

1330 transmitting, to the extended reality processing unit according to the at least one scheduled downlink radio resource, the reactive traffic

Figure 14:
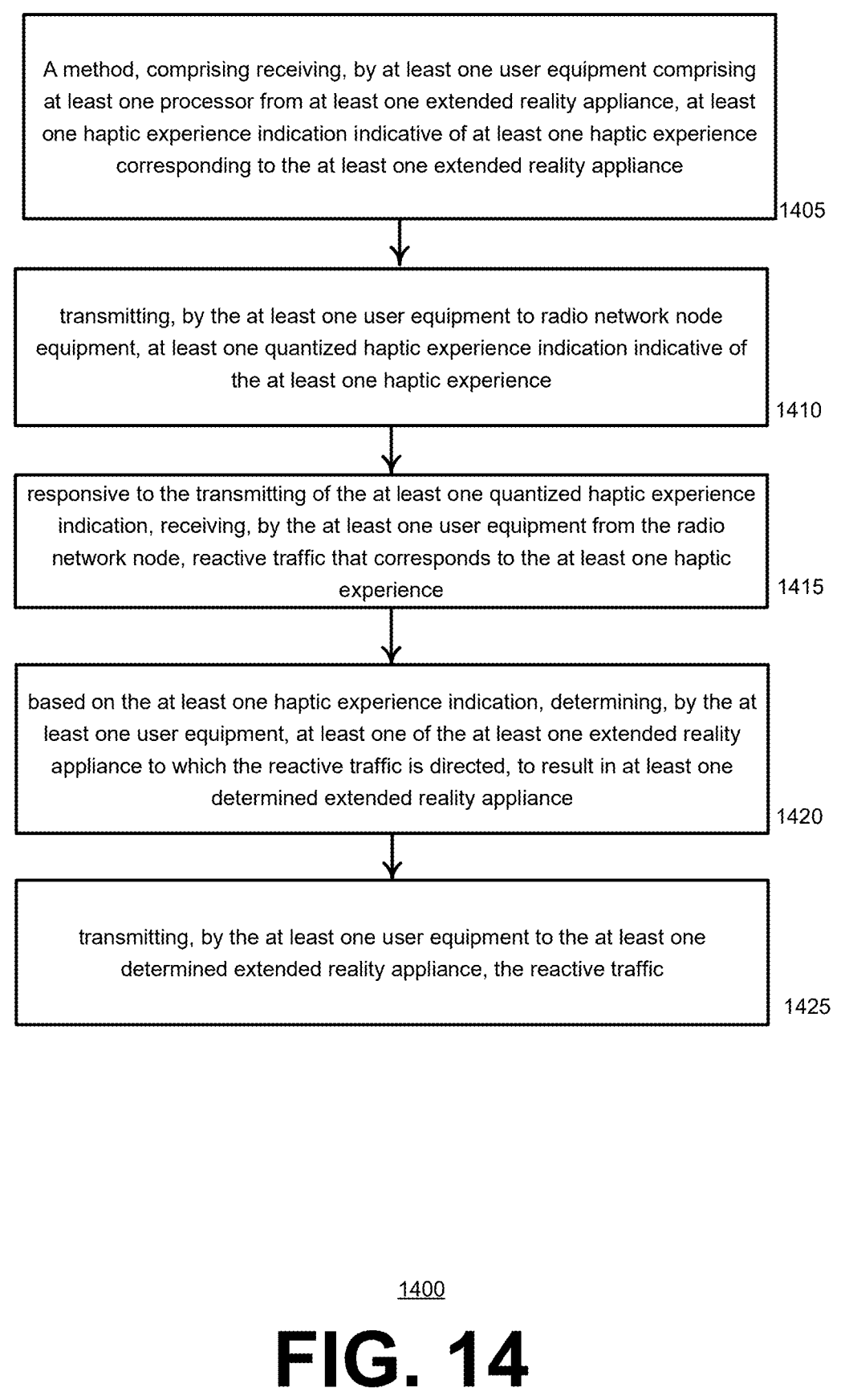

A method, comprising receiving, by at least one user equipment comprising at least one processor from at least one extended reality appliance, at least one haptic experience indication indicative of at least one haptic experience corresponding to the at least one extended reality appliance

1405 transmitting, by the at least one user equipment to radio network node equipment, at least one quantized haptic experience indication indicative of the at least one haptic experience

1410 responsive to the transmitting of the at least one quantized haptic experience indication, receiving, by the at least one user equipment from the radio network node, reactive traffic that corresponds to the at least one haptic experience

1415 based on the at least one haptic experience indication, determining, by the at least one user equipment, at least one of the at least one extended reality appliance to which the reactive traffic is directed, to result in at least one determined extended reality appliance

1420 transmitting, by the at least one user equipment to the at least one determined extended reality appliance, the reactive traffic

Figure 15:
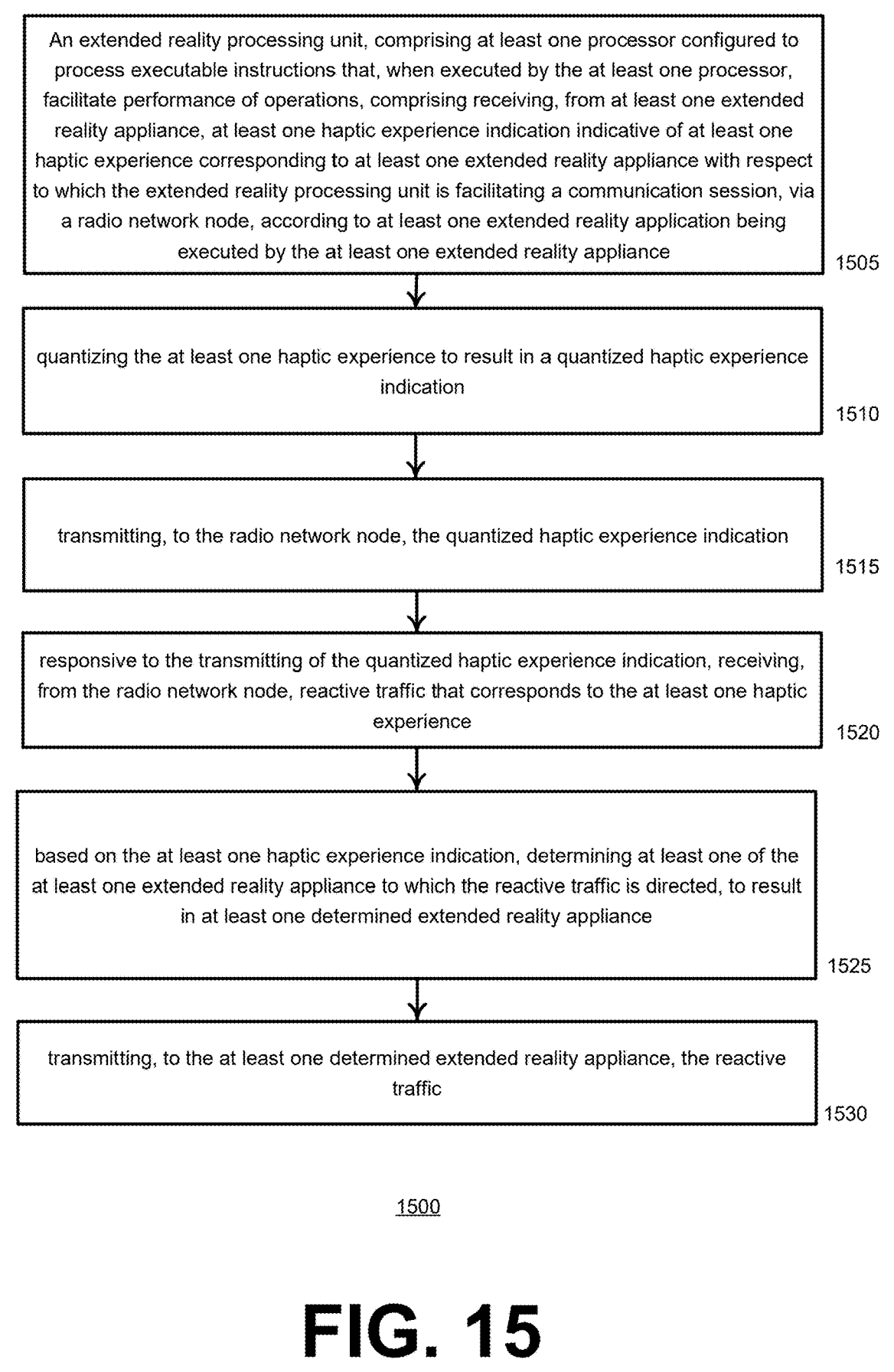

An extended reality processing unit, comprising at least one processor configured to process executable instructions that, when executed by the at least one processor, facilitate performance of operations, comprising receiving, from at least one extended reality appliance, at least one haptic experience indication indicative of at least one haptic experience corresponding to at least one extended reality appliance with respect to which the extended reality processing unit is facilitating a communication session, via a radio network node, according to at least one extended reality application being executed by the at least one extended reality appliance

1505 quantizing the at least one haptic experience to result in a quantized haptic experience indication

1510 transmitting, to the radio network node, the quantized haptic experience indication

1515 responsive to the transmitting of the quantized haptic experience indication, receiving, from the radio network node, reactive traffic that corresponds to the at least one haptic experience

1520 based on the at least one haptic experience indication, determining at least one of the at least one extended reality appliance to which the reactive traffic is directed, to result in at least one determined extended reality appliance

1525 transmitting, to the at least one determined extended reality appliance, the reactive traffic

Figure 16:
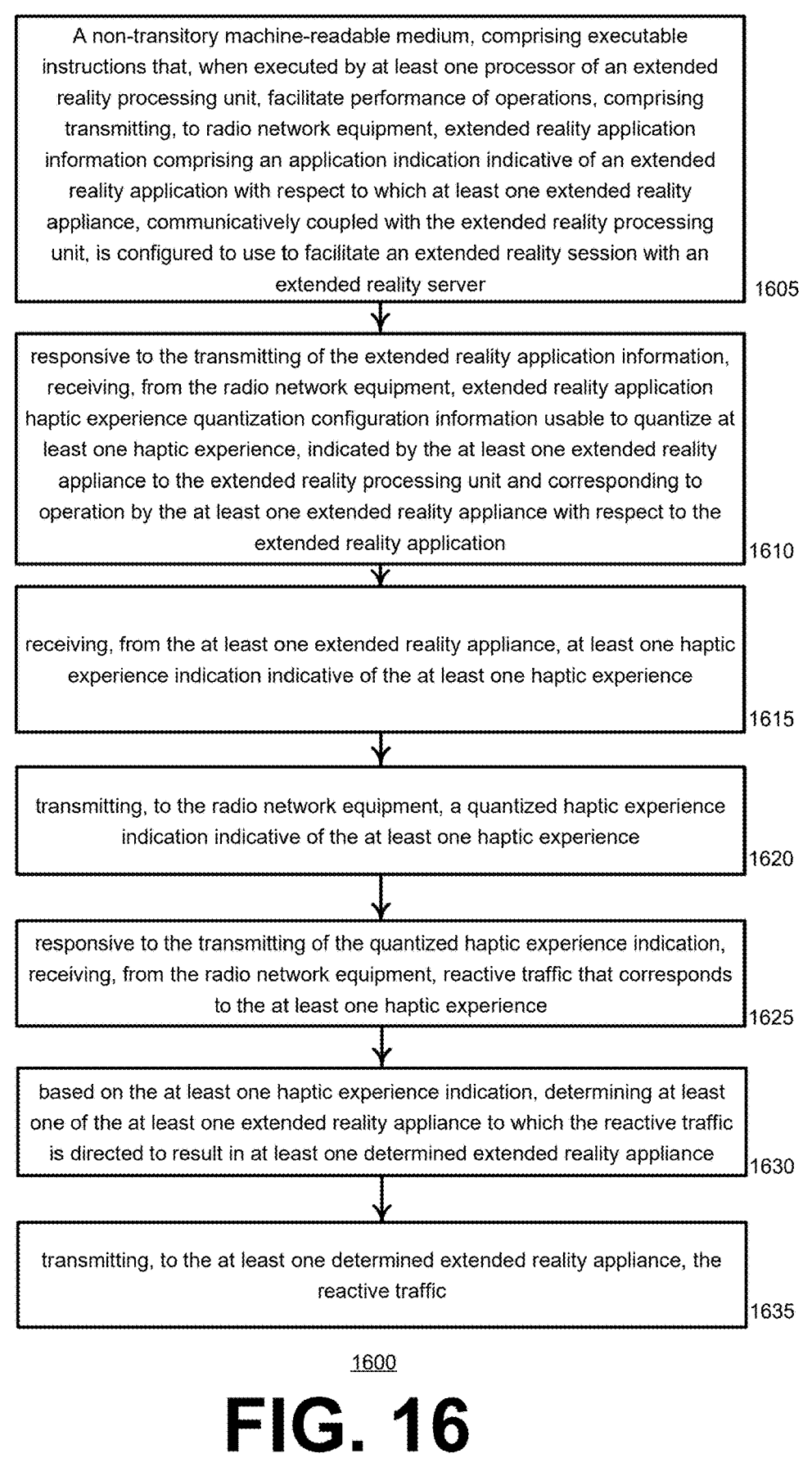

A non-transitory machine-readable medium, comprising executable instructions that, when executed by at least one processor of an extended reality processing unit, facilitate performance of operations, comprising transmitting, to radio network equipment, extended reality application information comprising an application indication indicative of an extended reality application with respect to which at least one extended reality appliance, communicatively coupled with the extended reality processing unit, is configured to use to facilitate an extended reality session with an extended reality server 1605 responsive to the transmitting of the extended reality application information, receiving, from the radio network equipment, extended reality application haptic experience quantization configuration information usable to quantize at least one haptic experience, indicated by the at least one extended reality appliance to the extended reality processing unit and corresponding to operation by the at least one extended reality appliance with respect to the extended reality application 1610 receiving, from the at least one extended reality appliance, at least one haptic experience indication indicative of the at least one haptic experience 1615 transmitting, to the radio network equipment, a quantized haptic experience indication indicative of the at least one haptic experience 1620 responsive to the transmitting of the quantized haptic experience indication, receiving, from the radio network equipment, reactive traffic that corresponds to the at least one haptic experience 1625 based on the at least one haptic experience indication, determining at least one of the at least one extended reality appliance to which the reactive traffic is directed to result in at least one determined extended reality appliance 1630 transmitting, to the at least one determined extended reality appliance, the reactive traffic 1635

SERVICE-AWARE QUANTIZATION OF EXTENDED-REALITY HAPTIC CONTROL INFORMATION

REFERENCE TO RELATED APPLICATIONS

The subject patent application is related to U.S. patent application Ser. No. 18/777,212, filed Jul. 18, 2024, and entitled "DYNAMIC COMPRESSION OF EXTENDED-REALITY HAPTIC TRAFFIC", the entirety of which application is hereby incorporated by reference herein.

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by at least one user equipment comprising at least one processor from at least one extended reality appliance, at least one haptic experience indication indicative of at least one haptic experience corresponding to the at least one extended reality appliance and transmitting, by the at least one user equipment to radio network node equipment, at least one quantized haptic experience indication indicative of the at least one haptic experience. Responsive to the transmitting of the at least one quantized haptic experience indication, the method may further comprise receiving, by the at least one user equipment from the radio network node, reactive traffic that corresponds to the at least one haptic experience. Based on the at least one haptic experience indication, the method may further comprise determining, by the at least one user equipment, at least one of the at least one extended reality appliance to which the reactive traffic is directed, to result in at least one determined extended reality appliance. The method may further comprise transmitting, by the at least one user equipment to the at least one determined extended reality appliance, the reactive traffic.

In an example embodiment, the method may further comprise receiving, by the at least one user equipment from the radio network node equipment, extended reality application haptic experience quantization configuration information usable by the at least one user equipment to quantize the at least one haptic experience indication to result in the at least one quantized haptic experience indication. Based on the extended reality application haptic experience quantization configuration information, the method may further comprise quantizing, by the at least one user equipment, the at least one haptic experience to result in the at least one quantized haptic experience indication. The extended reality application haptic experience quantization configuration information may comprise at least one haptic experience value being uniquely associated with at least one of the at least one haptic experience.

In an example embodiment, the method may further comprise transmitting, by the at least one user equipment to the radio network node equipment, extended reality application information comprising an application indication indicative of an extended reality application to which the at least one haptic experience corresponds. The extended reality application information further may further comprise at least one extended reality appliance count indication indicative of a number of the at least one extended reality appliance associated with an extended reality session corresponding to the extended reality application.

Responsive to the transmitting of the extended reality application information, the method may further comprise receiving, by the at least one user equipment from the radio network node equipment, extended reality application haptic experience quantization configuration information usable by the at least one user equipment to quantize the at least one haptic experience indication to use to determine the at least one quantized haptic experience indication. The extended reality application haptic experience quantization configuration information may be based on the extended reality application information and the number of the at least one extended reality appliance associated with an extended reality session.

In an example embodiment, the at least one extended reality appliance may comprise a first extended reality appliance and a second extended reality appliance. The at least one haptic experience indication may comprise a first haptic experience indication indicative of a first haptic experience that corresponds to the first extended reality appliance or a second haptic experience indication indicative of a second haptic experience that corresponds to the second extended reality appliance. The reactive traffic may comprise first reactive traffic that corresponds to the first haptic experience or second reactive traffic that corresponds to the second haptic experience. The reactive traffic may not be indicative of the first extended reality appliance or the second extended reality appliance.

In an example embodiment, the at least one extended reality appliance may comprise a first extended reality appliance and a second extended reality appliance. The at least one haptic experience indication comprises a first haptic experience indication indicative of a first haptic experience that corresponds to the first extended reality appliance or a second haptic experience indication indicative of a second haptic experience that corresponds to the second extended reality appliance. The first haptic experience indication may not be indicative of the first extended reality appliance and the second haptic experience indication may not be indicative of the second extended reality appliance.

In an example embodiment, the at least one haptic experience indication may be indicative of at least one movement direction of at least one of the at least one extended reality appliance or at least one manipulation of at least one control interface item corresponding to the at least one extended reality appliance.

In another example embodiment, an extended reality processing unit may comprise at least one processor configured to process executable instructions that, when executed by the at least one processor, may facilitate performance of operations that may comprise receiving, from at least one extended reality appliance, at least one haptic experience indication indicative of at least one haptic experience corresponding to at least one extended reality appliance with respect to which the extended reality processing unit is facilitating a communication session, via a radio network node, according to at least one extended reality application being executed by the at least one extended reality appliance, quantizing the at least one haptic experience to result in a quantized haptic experience indication, and transmitting, to the radio network node, the quantized haptic experience indication. Responsive to the transmitting of the quantized haptic experience indication, the operations may further comprise receiving, from the radio network node, reactive traffic that corresponds to the at least one haptic experience. Based on the at least one haptic experience indication, the operations may further comprise determining at least one of the at least one extended reality appliance to which the reactive traffic is directed, to result in at least one determined extended reality appliance. The operations may further comprise transmitting, to the at least one determined extended reality appliance, the reactive traffic.

The at least one haptic experience may comprise a first haptic experience corresponding to a first extended reality appliance and a second haptic experience corresponding to a second extended reality appliance. The quantized haptic experience indication is indicative of the first haptic experience and the second haptic experience. The quantized haptic experience indication may exclude, or may not include, information indicative of the first extended reality appliance or the second extended reality appliance. The reactive traffic may exclude information indicative of the first extended reality appliance or the second extended reality appliance.

In an example embodiment, the at least one haptic experience indication may be indicative of the at least one extended reality appliance corresponding to at least one haptic experience. The determining of the at least one determined extended reality appliance may be based on the at least one extended reality appliance being indicated by the at least one haptic experience indication.

In yet another example embodiment, a non-transitory machine-readable medium may comprise executable instructions that, when executed by at least one processor of an extended reality processing unit, may facilitate performance of operations that may comprise transmitting, to radio network equipment, extended reality application information comprising an application indication indicative of an extended reality application with respect to which at least one extended reality appliance, communicatively coupled with the extended reality processing unit, is configured to use to facilitate an extended reality session with an extended reality server. Responsive to the transmitting of the extended reality application information, The operations may further comprise receiving, from the radio network equipment, extended reality application haptic experience quantization configuration information usable to quantize at least one haptic experience, indicated by the at least one extended reality appliance to the extended reality processing unit and corresponding to operation by the at least one extended reality appliance with respect to the extended reality application. The operations may further comprise receiving, from the at least one extended reality appliance, at least one haptic experience indication indicative of the at least one haptic experience and transmitting, to the radio network equipment, a quantized haptic experience indication indicative of the at least one haptic experience. Responsive to the transmitting of the quantized haptic experience indication, the operations may further comprise receiving, from the radio network equipment, reactive traffic that corresponds to the at least one haptic experience. Based on the at least one haptic experience indication, the operations may further comprise determining at least one of the at least one extended reality appliance to which the reactive traffic is directed to result in at least one determined extended reality appliance. The operations may further comprise transmitting, to the at least one determined extended reality appliance, the reactive traffic.

In an example embodiment, based on the extended reality application haptic experience quantization configuration information, the operations may further comprise quantizing the at least one haptic experience to result in the quantized haptic experience indication.

In an example embodiment, the extended reality application haptic experience quantization configuration information may comprise at least one haptic experience value being uniquely associated with one of the at least one haptic experience.

In an example embodiment, the at least one extended reality appliance may comprise a first extended reality appliance and a second extended reality appliance. The at least one haptic experience indication may comprise a first haptic experience indication indicative of a first haptic experience that corresponds to the first extended reality appliance or a second haptic experience indication indicative of a second haptic experience that corresponds to the second extended reality appliance. The reactive traffic may comprise first reactive traffic that corresponds to the first haptic experience or second reactive traffic that corresponds to the second haptic experience. The reactive traffic may not be indicative of the first extended reality appliance or the second extended reality appliance.

In an example embodiment, the at least one extended reality appliance may comprise a first extended reality appliance and a second extended reality appliance. The at least one haptic experience indication may comprise a first haptic experience indication indicative of a first haptic experience that corresponds to the first extended reality appliance or a second haptic experience indication indicative of a second haptic experience that corresponds to the second extended reality appliance. The first haptic experience indication may not be indicative of the first extended reality appliance and the second haptic experience indication may not be indicative of the second extended reality appliance.

In another example embodiment, a method may comprise facilitating, by radio network node equipment comprising at least one processor, receiving, from at least one user equipment, extended reality application information comprising an application indication indicative of an extended reality application with respect to which at least one extended reality appliance, communicatively coupled with the at least one user equipment, is capable of using to facilitate an extended reality session. The method may further comprise facilitating, by the radio network node equipment, transmitting, to the at least one user equipment, extended reality haptic experience quantization configuration information that is based at least on the extended reality application, facilitating, by the radio network node equipment, receiving, from the at least one user equipment, at least one quantized haptic experience indication indicative of at least one haptic experience corresponding to the at least one extended reality appliance, and facilitating, by the radio network node equipment, transmitting, to the at least one user equipment, reactive traffic corresponding to the at least one haptic experience.

In an example embodiment, responsive to receiving the extended reality application information, the method may further comprise directing, by the radio network node equipment to extended reality server computing equipment, an extended reality application haptic experience information request comprising a request for extended reality application haptic experience information corresponding to the extended reality application. Responsive to the extended reality application haptic experience information request, the method may further comprise facilitating, by the radio network node equipment, receiving the extended reality application haptic experience information directed, by the extended reality server computing equipment, to the radio network node equipment. The extended reality application haptic experience information may comprise the extended reality haptic experience quantization configuration information.

In an example embodiment, the method may further comprise generating, by the radio network node equipment, at least one quantization value corresponding to the extended reality application haptic experience information and associating the at least one quantization value with the extended reality application haptic experience information to result in the extended reality haptic experience quantization configuration information.

In an example embodiment, the extended reality haptic experience quantization configuration information may comprise at least one haptic experience value being uniquely associated with the at least one haptic experience.

In an example embodiment, the at least one quantized haptic experience indication may comprise a first quantized haptic experience indication indicative of a first haptic experience or a second quantized haptic experience indication indicative of a second haptic experience. The reactive traffic may comprise first reactive traffic that corresponds to the first haptic experience or second reactive traffic that corresponds to the second haptic experience. The reactive traffic may exclude information indicative of the at least one extended reality appliance.

In an example embodiment, the at least one quantized haptic experience indication may comprise a first quantized haptic experience indication indicative of a first haptic experience or a second quantized haptic experience indication indicative of a second haptic experience. The first quantized haptic experience indication and the second quantized haptic experience indication may exclude information indicative of the at least one extended reality appliance.

In an example embodiment, the at least one quantized haptic experience indication may be indicative of at least one movement direction of at least one of the at least one extended reality appliance or at least one manipulation of at least one control interface item corresponding to the at least one extended reality appliance.

In an example embodiment, the at least one quantized haptic experience indication May comprise a first quantized haptic experience indication indicative of a first haptic experience corresponding to the at least one extended reality appliance and a second quantized haptic experience indication indicative of a second haptic experience corresponding to the at least one extended reality appliance. The first quantized haptic experience indication may comprise a first value indicative of the first haptic experience. The second quantized haptic experience indication may comprise a second value indicative of the second haptic experience. The extended reality haptic experience quantization configuration information may comprise a first association of the first value with the first haptic experience and a second association of the second value with the second haptic experience.

The first haptic experience may correspond to a first extended reality appliance. The second haptic experience may correspond to a second extended reality appliance. The first quantized haptic experience indication may exclude first information indicative of the first extended reality appliance. The second quantized haptic experience indication may exclude second information indicative of the second extended reality appliance. The reactive traffic may comprise first reactive traffic that corresponds to the first haptic experience and second reactive traffic that corresponds to the second haptic experience. The reactive traffic may exclude third information indicative of the first extended reality appliance or the second extended reality appliance.

In another example embodiment, a radio network node may comprise at least one processor configured to process executable instructions that, when executed by the at least one processor, may facilitate performance of operations that may comprise receiving, from an extended reality processing unit, extended reality application information comprising an application indication indicative of an extended reality application with respect to which a first extended reality appliance and a second extended reality appliance, communicatively coupled with the extended reality processing unit, are capable of using to facilitate an extended reality session. Responsive to receiving the extended reality application information, the operations may further comprise transmitting, to the extended reality processing unit, haptic experience quantization configuration information that is based on the extended reality application information, receiving, from the extended reality processing unit, at least one quantized haptic experience indication indicative of at least one haptic experience corresponding to at least one of the first extended reality appliance or the second extended reality appliance, wherein the haptic experience quantization configuration information comprises the at least one quantized haptic experience indication, and transmitting, to the extended reality processing unit, reactive traffic corresponding to the at least one haptic experience.

In an example embodiment, the at least one quantized haptic experience indication may comprise a first quantized haptic experience indication indicative of a first haptic experience that corresponds to the first extended reality appliance and a second quantized haptic experience indication indicative of a second haptic experience that corresponds to the second extended reality appliance. The reactive traffic may comprise first reactive traffic that corresponds to the first haptic experience and second reactive traffic that corresponds to the second haptic experience. The reactive traffic may not be indicative of the first extended reality appliance or the second extended reality appliance.

The at least one quantized haptic experience indication may comprise a first quantized haptic experience indication indicative of a first haptic experience that corresponds to the first extended reality appliance and a second quantized haptic experience indication indicative of a second haptic experience that corresponds to the second extended reality appliance. The first quantized haptic experience indication may not be indicative of the first extended reality appliance and the second quantized haptic experience indication may not be indicative of the second extended reality appliance.

In an example embodiment, the at least one quantized haptic experience indication may not be indicative of the first extended reality appliance or the second extended reality appliance. The reactive traffic may comprise first reactive traffic that corresponds to a first haptic experience associated with the first extended reality appliance and second reactive traffic that corresponds to a second haptic experience associated with the second extended reality appliance. The reactive traffic may not be indicative of the first extended reality appliance or the second extended reality appliance.

In an example embodiment, the operations may further comprise transmitting, to extended reality server equipment, the extended reality application information. Responsive to transmitting the extended reality application information, the operations may further comprise receiving, from the extended reality server equipment, the haptic experience quantization configuration information.

In an example embodiment, responsive to receiving the extended reality application information, the operations may further comprise directing, to an extended reality server, an extended reality application haptic experience information request comprising a request for extended reality application haptic experience information corresponding to the extended reality application. Responsive to the extended reality application haptic experience information request, the operations may further comprise receiving the extended reality application haptic experience information. The operations may further comprise determining at least one quantization value corresponding to the extended reality application haptic experience information to result in at least one determined quantization value and associating the at least one determined quantization value with the extended reality application haptic experience information to result in the haptic experience quantization configuration information.

In yet another example embodiment, a non-transitory machine-readable medium may comprise executable instructions that, when executed by at least one processor of radio network equipment, may facilitate performance of operations that may comprise receiving, from an extended reality processing unit, extended reality application information comprising an application indication indicative of an extended reality application with respect to which at least one extended reality appliance, communicatively coupled with the extended reality processing unit, is capable of using to facilitate an extended reality session with respect to core network equipment, associated with a core network, that is configured to facilitate the extended reality session. Responsive to receiving the extended reality application information, The operations may further comprise directing, to the core network equipment, an extended reality application haptic experience configuration information request comprising a request for extended reality application haptic experience configuration information corresponding to the extended reality application. Responsive to the extended reality application haptic experience configuration information request, The operations may further comprise receiving, from the core network equipment, the extended reality application haptic experience configuration information. The operations may further comprise receiving, from the extended reality processing unit, a quantized haptic experience indication indicative of at least one haptic experience, indicated by the extended reality application haptic experience configuration information and corresponding to the at least one extended reality appliance and receiving, from the core network equipment, reactive traffic corresponding to the at least one haptic experience indicated by the quantized haptic experience indication. The operations may further comprise scheduling at least one downlink radio resource usable to facilitate delivery of the reactive traffic to the extended reality processing unit to result in at least one scheduled downlink radio resource and transmitting, to the extended reality processing unit according to the at least one scheduled downlink radio resource, the reactive traffic.

In an example embodiment, the at least one extended reality appliance may comprise a first extended reality appliance and a second extended reality appliance. The quantized haptic experience indication may comprise a first quantized haptic experience indication indicative of a first haptic experience that corresponds to the first extended reality appliance or a second quantized haptic experience indication indicative of a second haptic experience that corresponds to the second extended reality appliance. The reactive traffic may comprise first reactive traffic that corresponds to the first haptic experience or second reactive traffic that corresponds to the second haptic experience. The reactive traffic may be directed to the extended reality processing unit. The at least one scheduled downlink radio resource may not be scheduled exclusively with respect to either the first reactive traffic or the second reactive traffic.

In an example embodiment, the at least one extended reality appliance may comprise a first extended reality appliance and a second extended reality appliance. The quantized haptic experience indication may comprise a first quantized haptic experience indication indicative of a first haptic experience that corresponds to the first extended reality appliance or a second quantized haptic experience indication indicative of a second haptic experience that corresponds to the second extended reality appliance. The first quantized haptic experience indication may not be indicative of the first extended reality appliance and the second quantized haptic experience indication may not be indicative of the second extended reality appliance. The at least one scheduled downlink radio resource may be usable by the extended reality processing unit to receive traffic corresponding to the first extended reality appliance or the second extended reality appliance.

BRIEF DESCRIPTION OF THE DRAWINGS

FIG. 6 illustrates example extended reality application haptic experience quantization configuration information.

FIG. 9 illustrates a timing diagram of an example embodiment of an intermediate processing unit facilitating an extended reality session using quantized haptic experience information.

FIG. 11 illustrates a block diagram of an example method embodiment.

FIG. 12 illustrates a block diagram of an example radio network node.

FIG. 13 illustrates a block diagram of an example non-transitory machine-readable medium embodiment.

FIG. 14 illustrates a block diagram of an example method embodiment.

FIG. 15 illustrates a block diagram of an example extended reality processing unit.

FIG. 16 illustrates a block diagram of an example non-transitory machine-readable medium embodiment.

DETAILED DESCRIPTION

Figure 1:
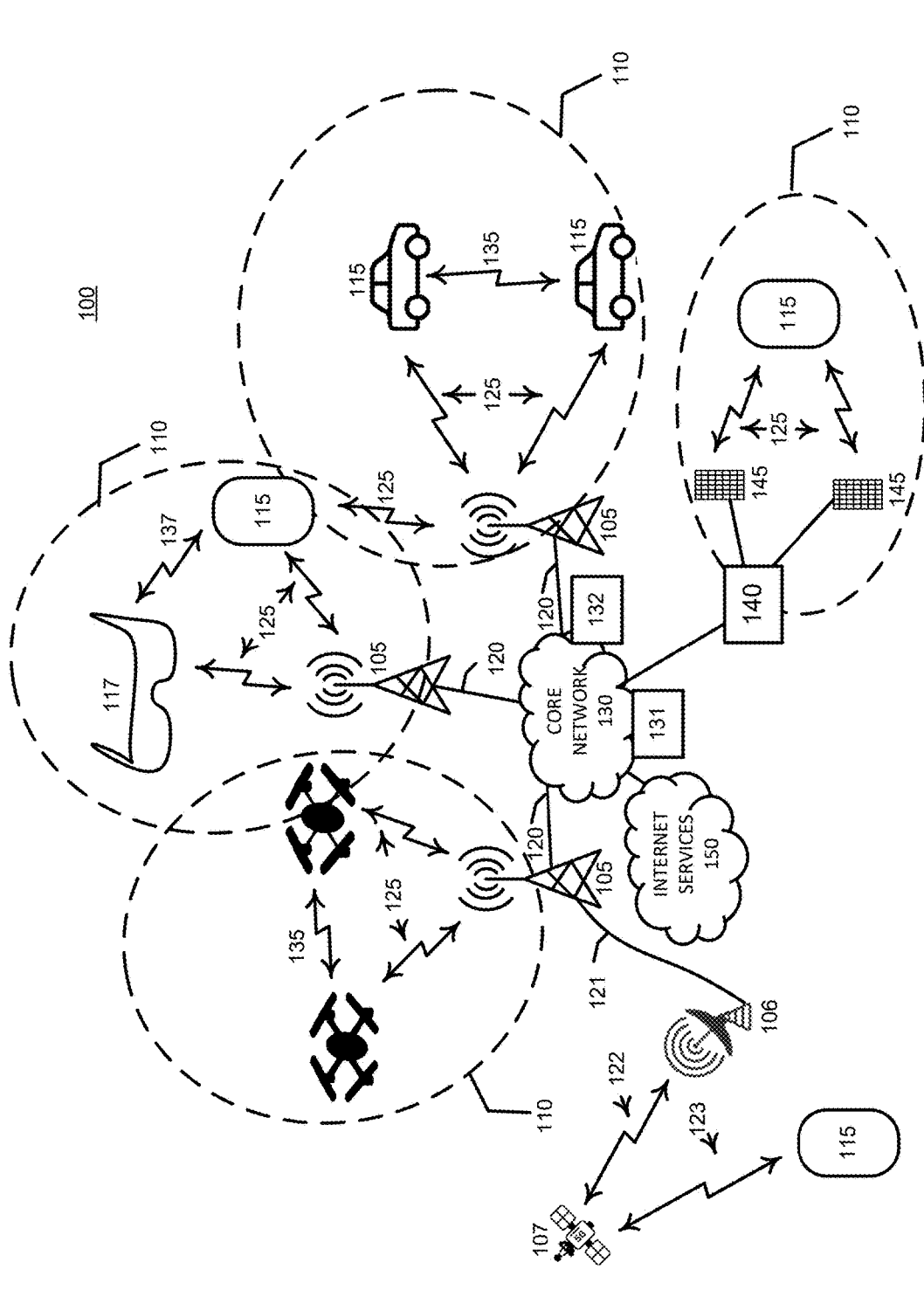
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'extended reality' ("XR") services. XR services may refer to, or may be referred to as, anything reality services. XR services may comprise VR applications, which are widely adopted XR applications that provide an immersive environment that can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed Reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to a 5 Mbps URLLC link with a 1 ms radio budget, some XR applications need 100 Mbps links with a couple of milliseconds of allowed radio latency. Thus, 5G radio design and associated procedures may be adapted to the new XR QoS class and associated performance targets.

An XR service may be facilitated by traffic having certain characteristics associated with the XR service. For example, XR traffic may typically be periodic with time-varying packet size and packet arrival rate. In addition, different packet traffic flows of a single XR communication session may affect an end user's experience differently. For instance, a smart glass that is streaming 180-degree high-resolution frames may use a large percentage of a broadband service's capacity for fulfilling a user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets, of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at an XR capable device is desirable. Accordingly, a user equipment or a user device accessing XR services, or traffic flows of an XR session, may be associated with certain QoS parameter criterion/criteria to satisfy performance targets of the XR service. Measured traffic values, or metrics, may correspond to a QoS, or analyzed with respect to, parameter criterion/criteria, such as, for example, a data rate, an end-to-end latency, or a reliability.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic.

Multi-modal XR applications may integrate different technologies to offer a versatile and comprehensive user experience. For example, a multi-modal XR application might use VR to immerse users in a virtual training environment and then seamlessly switch to AR or MR to provide real-time feedback or overlay instructional information corresponding to physical objects that may appear in an environment viewed by an XR user. Such feedback or instructional information may relate to stationary objects or may be information that does not change frequently and may be referred to as stable information.

An advantage of multi-modal XR applications is the adaptability to facilitate different contexts and different user preferences. An XR application can provide varying levels of immersion and interaction, allowing users to choose the most suitable mode of engagement based on the user's needs or the specific task at hand. Additionally, multi-modal XR can enable collaborative experiences, allowing users in different physical locations to interact within the same virtual space.

Uses of multi-modal XR applications extend beyond entertainment and gaming, with widespread adoption in fields such as healthcare, education, engineering, and marketing. Medical practitioners can use multi-modal XR applications to simulate complex surgeries, educators can create interactive and immersive learning experiences, and architects can visualize and modify building designs in real-time.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long-Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, laptop computers, tablet computers, automobiles or other vehicles, or drones or other aircraft. Another example of a UE may be a virtual reality/extended reality appliance 117, such as smart glasses, a virtual reality headset, an augmented reality headset, and other similar devices that may provide images, video, audio, touch sensation, taste, or smell sensation to a wearer. A UE, such as XR appliance 117, may transmit or receive wireless signals with a RAN base station 105 via a long-range wireless link 125, or the UE/XR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a RAN base station 105 and over a short-range wireless link. XR appliance 117 may also communicate with a wireless UE via a cable, or other wired connection. An XR appliance 117 may offload processing functionality or functionality related to communicating with a RAN, to a user equipment 115, which may be referred to as an intermediate user equipment or an XR processing unit. An XR processing unit or a RAN, or a component thereof, may be implemented by one or more computer components that may be described in reference to FIG. 17. An XR processing unit may also comprise components described in reference to FIG. 18.

Continuing with discussion of FIG. 1, base stations 105, which may be referred to as radio access network nodes or cells, may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and Nr may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., Nr) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example, a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one component carrier, or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of
UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHZ) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHZ), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Core network 130 may comprise, or may be communicatively coupled with, shared core entity 131, which may be referred to as a shared core entity node or a shared core node. Shared core entity 131 may be associated with TN node 105 or NTN node 107 and may facilitate unified interfacing among TN node 105, NTN node 107, and elements of core network 130. For example, TN node 105 and NTN node 107 may not be configured to communicate directly with one another due to different communication protocols due to absence of direct communication links therebetween, due to configuration incompatibility (e.g., NTN satellite node 107 and TN RAN node 105 being operated by different entities that have declined to configure equipment corresponding to the different entities to interoperate with each other), or due to other reasons. Accordingly, shared core entity 131 may be configured to facilitate joint scheduling, joint interference detection, joint operation of coordination algorithms, or other joint operations between RAN node 105 and NTN node 107. Shared node 131 may facilitate maintaining of user equipment information privacy with respect to RAN node 105 or NTN node 107 that may be operated by a different operator or service provider than an operator or provider with which the user equipment is subscribed to operate. Shared core entity 131 may facilitate executing software instructions that may be provided by an entity other than an operator of NTN node 107 or TN RAN node 105, and thus may facilitate efficient TN-NTN system integration without private terrestrial network information being shared with a non-terrestrial network, and vice versa.

Figure 2:
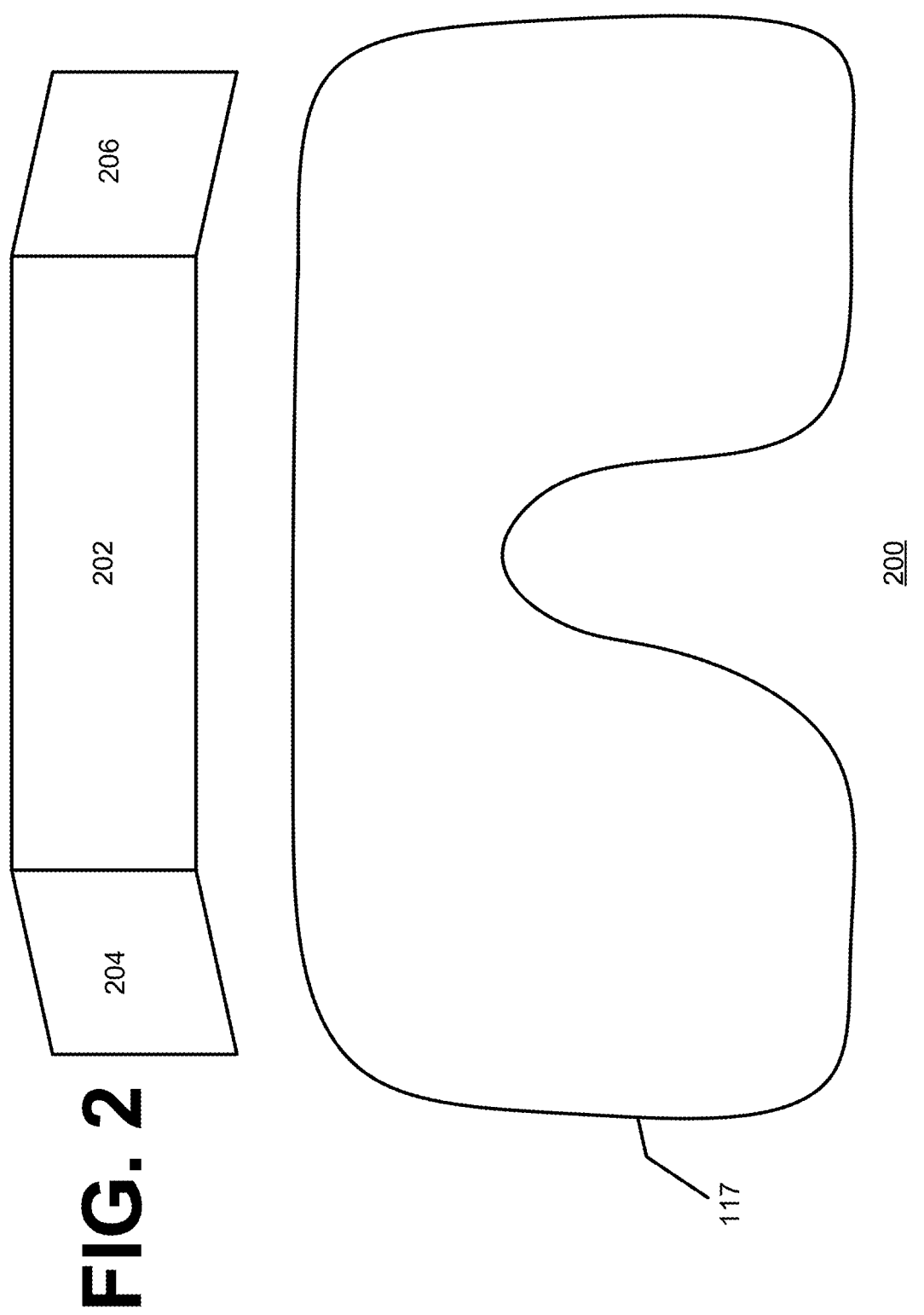
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in FIG. 2, portions 202, 204, and 206 are delineated by distinct lines, but it will be appreciated that hardware or software may facilitate gradual transition from main and peripheral information display. Appliance 117 may generate signals comprising information indicative of movement or manipulation of the appliance, which may be caused by a user of the appliance. Such movement or manipulation may be referred to as haptic movement or manipulation. A haptic movement or manipulation experienced by an appliance 117 may be referred to as a haptic experience.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to a 5 Mbps URLLC link with a 1 ms radio latency budget, some XR applications require 100 Mbps links with about 2 mS allowed radio latency.

From research, several characteristics have been determined with respect to XR data traffic: (1) XR traffic characteristics are typically periodic with time-varying packet size and packet arrival rate; (2) XR capable devices (e.g., smart glasses, projection wearables, etc.) may be more power-limited than conventional mobile handsets, due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing an XR service may be at least partially determined according to satisfaction of a user of the XR services. Each XR-service-using user equipment or user device may be associated with certain QoS parameter criterion/criteria with respect to which measured values, or metrics, corresponding to traffic flows that facilitate XR service may be analyzed. Adjusting scheduling of traffic such that a measured traffic flow metric satisfies a QoS parameter, such as, for example, a data rate, an end-to-end latency, or a reliability may be beneficial to a user's XR experience.

A 5G NR radio system typically comprises a physical downlink control channel ("PDCCH") and a physical uplink control channel ("PUCCH"), which may be used to deliver downlink and uplink control information, respectively, with respect to wireless user equipment or user devices. A 5G control channel may facilitate operation according to requirements of URLLC and eMBB use cases and may facilitate an efficient coexistence between such different QoS classes.

In an embodiment, a user equipment may be deployed as an extended reality processing unit and may facilitate communication with a RAN node on behalf of a less capable end XR appliance (e.g., less capable in terms of processing power, battery capacity, transmitter power, or the like). An extended reality processing unit may comprise an 'in-box' processing unit/device that facilitates signaling, traffic handling, and overall radio assistance to an end XR appliance (e.g., helmets, or glasses), which may be capable of communicating directly with a RAN node but with reduced capability. Accordingly, an XR processing unit, which may be referred to as an intermediate XR processing unit, (e.g., a laptop or smartphone that is intermediate with respect to communication links between a RAN node and an end XR appliance) may facilitate relaxing a large subset of radio function and operations, traffic processing, and battery consumption load with respect to an end XR appliance thus leading to a more efficient end XR device design (e.g., requiring less battery size, dissipating less heat, etc.).

Operation with respect to many emerging XR use cases may be facilitated by XR appliances, during an XR session, experiencing haptic actions and generating haptic information corresponding thereto. For example, an XR bracelet may experience real-time motion of a user's hand and generate corresponding haptic information based on the hand motion. The generated haptic information may be provided as an input to, and thus may control behavior of, an executing XR application facilitating the XR session. Accordingly, such per-XR-appliance haptic information may be translated into radio control information that may be timely delivered, via radio interface link(s), to an XR server/edge entity that is facilitating the XR session. With multi-XR-appliance deployments, wherein multiple end XR appliances may use the same XR application for the same XR session, (e.g., multi-device gaming scenarios or multi-device emergency scenarios, etc.), each XR-appliance may translate haptic movements corresponding to the appliance into radio control information and attach the appliance's unique identifier into control information before rapidly transmitting the control information via uplink radio interface link(s). Such including of an appliance's unique identification information may result in a problem of over-consuming, or overwhelming, uplink control channel resource with frequent XR haptic control information that include appliance device identification information.

Embodiments disclosed herein may provide a solution to the problem of over consumption of uplink control channel resources. According to embodiments disclosed herein, an extended reality intermediate processing unit (e.g., a master control processing unit, such as a PC/Laptop, or a smartphone/tablet) locally serving multiple end (e.g., slave) XR appliances, such as, for example, glasses, helmets, bracelets, watches, and the like, may dynamically quantize haptic information generated by the appliance to result in compression of the haptic information. The XR processing unit may aggregate and dynamically quantize multi-device haptic control information, which corresponds to haptic movements actually executed at, or experienced by, the end XR appliances. The XR processing unit may 'scrape' (e.g., avoid attaching) device identification information corresponding to the appliances from messages that report to a RAN node the haptic control information thus leading to less signaling overhead being used to deliver the XR haptic information. However, to facilitate such device identification 'scraping' the XR processing unit and a serving RAN node coordinate according to special traffic delivery and decoding behaviors.

In embodiments disclosed herein, a RAN node may facilitate traffic scheduling and delivery such that the RAN schedules and transmits multiple reactive downlink traffic flows, corresponding to multiple XR appliances and generated in response to, or in reaction to, quantized haptic indication information received by the RAN node. The reactive traffic may be scheduled for transmission to, and may be transmitted to, the XR processing unit even though the traffic may have been generated in reaction to haptic actions experienced by multiple XR appliances communicatively coupled with the XR processing unit. The reactive traffic may be transmitted to the XR processing unit without identifying to which XR appliances multiple portions of the reactive traffic, which may be reactive to haptic actions experienced by the XR appliances, the reactive traffic portions are directed. The quantized low-overhead XR haptic indication information may facilitate reducing uplink control overhead but consequently the RAN node is not aware of which end XR appliance(s) one or more haptic action(s) correspond to. Instead, the RAN node is only aware of aggregated/quantized haptic control information indicated by the XR processing unit. Accordingly, determining to which of one or more XR appliances to distribute reactive traffic that corresponds to quantized haptic action(s) experience indication(s) may be performed by the XR processing unit instead of the RAN node, which may avoid overwhelming the serving RAN node, and corresponding radio interface link(s), with frequent, large device-specific haptic information messages.

According to conventional techniques, scheduling and traffic delivery procedures dictate that a RAN node is aware of a destination device to which traffic to be delivered is directed. According to example embodiments disclosed herein, low uplink signaling overhead techniques may facilitate a RAN node in delivering multiple downlink traffic corresponding to multiple XR appliances without the RAN node being aware of which specific appliance a traffic flow is directed to, wherein such determination is offloaded for local determination by an XR processing unit.

According to conventional techniques, a user equipment may compile a control message comprising control information corresponding to the user equipment or user device itself, or corresponding to devices in proximity. The control message may be embedded with identification information corresponding to the user equipment or the proximate devices to facilitate the RAN node being aware of which device the control information corresponds to. In contrast, according to embodiments disclosed herein, control information, for example, haptic action experience control information, corresponding to multiple devices, for example, end XR appliances, may be quantized into quantized haptic experience indications and embedded in a single control message that does not include conventional unique identifiers that correspond to the multiple devices.

Figure 3:
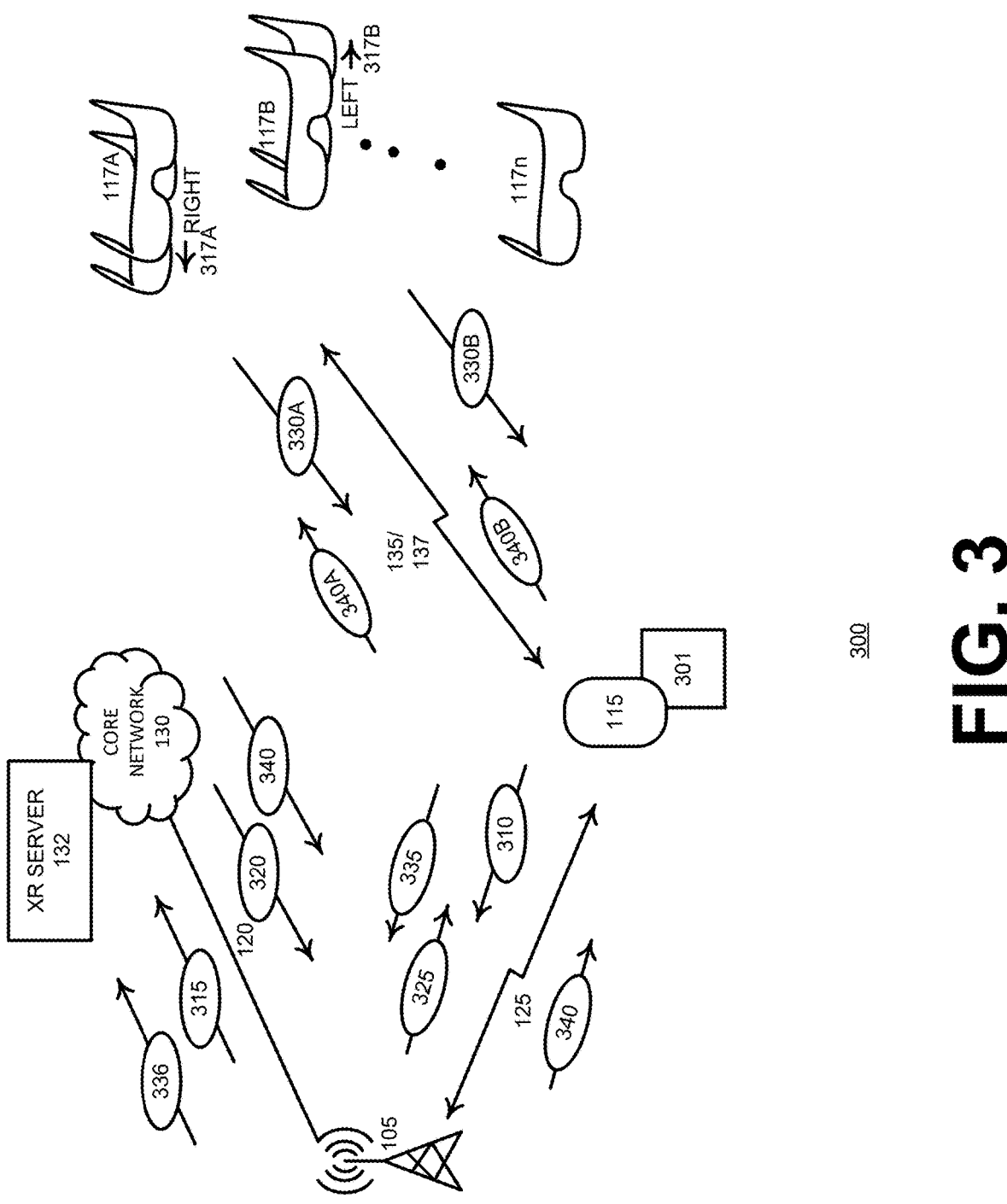
FIG. 3 illustrates an example environment with multiple extended reality appliances tethered to an extended reality intermediate processing unit.

Turning now to FIG. 3, the figure illustrates an example environment 300 with multiple extended reality appliances 117 tethered to an extended reality processing unit user equipment 115. An appliance 117 may be referred to as an end XR appliance in reference to the relationship of being at an end of a communication session, with respect to RAN node 105, with extended reality processing unit 115 being located intermediate to the RAN node and the appliance. In an example embodiment, RAN node 105 may comprise a terrestrial radio network node. In an example embodiment, RAN node 105 may comprise a non-terrestrial radio network node. XR processing unit 115 may be more capable with respect to battery capacity (or may be supplied power via a wired power supply receiving power from an electrical wall outlet), or with respect to processing capability, than an XR appliance 117. In an embodiment, a downlink traffic flow providing traffic to a peripheral portion 204/206 (shown in FIG. 2) of a VR/XR appliance 117 may be related to, or responsive to, a downlink traffic flow carrying traffic to be displayed by a pose portion 202 of the appliance. Downlink traffic that is responsive to uplink traffic, such as haptic information conveyed via uplink control traffic, may be referred to as reactive traffic. In an example, two different traffic flows may respectively carry traffic directed to right side 202R and left side 202L of pose portion 202 and thus may be related. In another example, an uplink traffic flow may carry traffic related to a downlink traffic flow.

Facilitating extended reality services via cellular wireless communications may negatively impact spectral efficiency or energy consumption at RAN nodes or user equipment due to stringent combined requirements regarding capacity, latency, and reliability, one or more of which may tend to impose contradictory requirements with respect to one or more of the other requirements. For example, to facilitate capacity and video rendering requirements corresponding to many XR applications, advanced multi-antenna system, sophisticated processing, and larger battery capacities may be used at end XR devices/appliance, which may cause an increase in weight and heat generated and may detract from appearance of an end XR device/appliance (e.g., XR glass, helmet, or bracelet, etc.).

Deployment of a high-capability (with respect to an XR appliance 117) intermediate XR processing unit 115 between RAN node 105 and a XR appliance processing unit may facilitate relaying part of, or all of, XR radio traffic to or from the end XR device/appliance 117, thus reducing radio burden from the end XR appliance and facilitating the XR appliance being lower capability and lower weight than if the XR processing unit is not available to facilitate relaying of XR traffic between the appliance and RAN node. Burdens that may be offloaded from an end XR appliance 117 to intermediate XR processing unit 115 may comprise, for example, local traffic storage, processing of heavy control channel decoding, XR local video rendering, or advanced radio antenna manipulation. Thus, advanced receiver and processing capability may be facilitated for critical XR services with respect to an XR appliance 117, which may be lighter, more aesthetically pleasant, and more efficient than if the end XR appliance is not designed with capability to offload the burdens to intermediate XR processing unit 115.

RAN node 105 may receive, via uplink radio interface link(s) 125, extended reality application information message 310 transmitted by extended reality ("XR") intermediate/master processing unit/device 115, which may comprise multi-traffic-profile capability. Message 310 may comprise information corresponding to, or indicative of, an extended reality application that may be executed by intermediate processing unit 115 and which may be executed by, or may facilitate, an extended reality session with at least one extended reality appliance 117.

Figure 4:
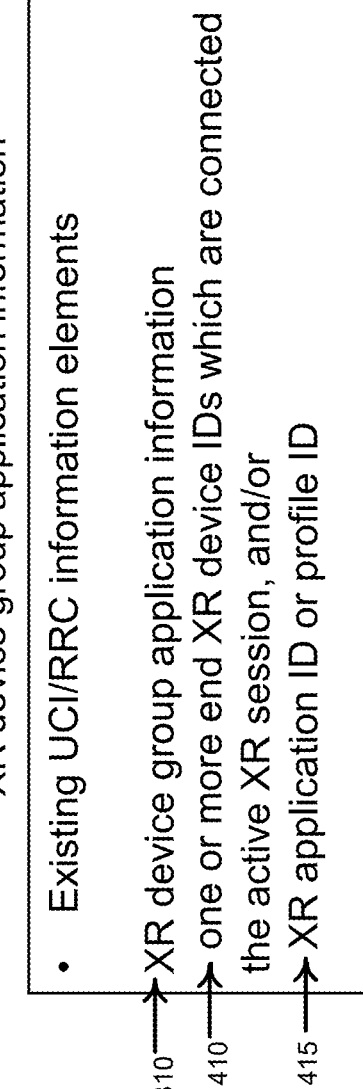
FIG. 4 illustrates example extended reality application information.

As illustrated in FIG. 3, RAN node 105 may receive from intermediate XR processing unit 115 via radio interface link(s) 125 message 310. Message 310 may be received as an uplink control information ("UCI") message or as uplink radio resource control ("RRC") signaling, XR device group application information, which may be referred to as extended reality application information. As shown in FIG. 4, information message 310 may comprise in field 410 at least one XR appliance identifier indicative of at least one appliance 117, which may be communicatively coupled with XR processing unit 115 and which may be setting up, or which may have set up, an extended reality session to be, or that is being, facilitated by the XR processing unit. Message 310 may comprise in field 415 at least one identifier indicative of an XR application 301 or indicative of an XR profile corresponding to the XR application, wherein application 301 may be used to facilitate the XR session. Indication, in field 415 of message 310, of extended reality application 301 may facilitate RAN node 105 being made aware of application 301, or a profile related thereto. An indication in field 415 may facilitate RAN node 105 indicating application 301, or a related profile, to extended reality server 132.

RAN node 105 may transmit, towards core network entities 130 and/or XR edge server 132 via backhaul interface link(s), an XR application profile information request 315, which may be referred to as an extended reality application haptic experience information request. Request 315 may comprise a request for extended reality application haptic experience information corresponding to extended reality application 301 identified in message 310. Request 315 may comprise an identifier of, or an indication indicative of, XR application 301. RAN node 105 may use request 315 to fetch information corresponding to XR application 301 in terms of whether the application supports haptic control information being transmitted relative to haptic movements, for example, rightward movement 317A corresponding to application 117A or leftward movement 317B corresponding to application 117B shown in FIG. 3.

Figure 5:
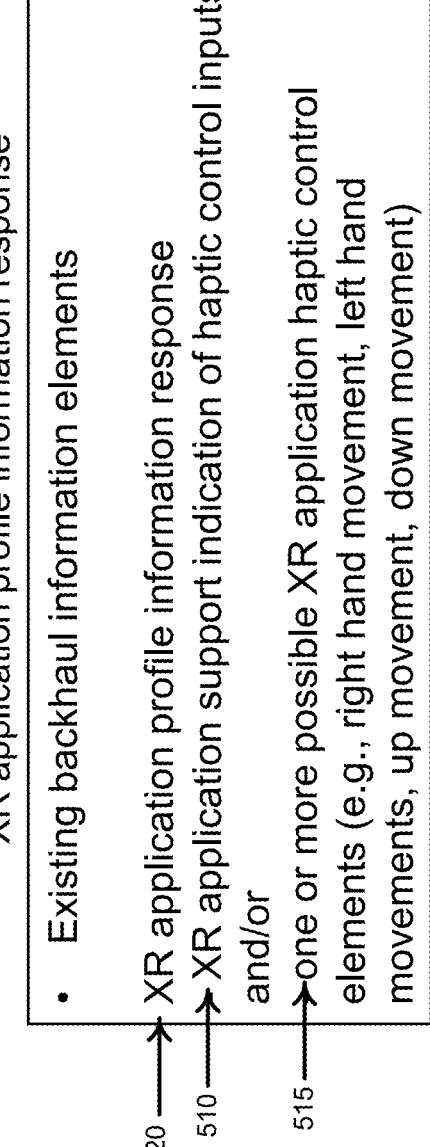
FIG. 5 illustrates example extended reality application haptic experience information.

Responsive to transmitting request 315, RAN node 105 may receive, from core network 130 or server 132 via link(s) 120, XR application profile information response 320, which may comprise, and which may be referred to as, extended reality application haptic experience information. Information message 320 may comprise in field 510 shown in FIG. 5 a haptic control message support indication indicative of XR server 132 being capable of handling control traffic that indicates haptic experience information corresponding to haptic experiences, for example, experiences 317A and 317 B shown in FIG. 3. Information message 320 may comprise, as shown in field 515 of FIG. 5, at least one possible XR application haptic experience, or control parameter corresponding thereto, that may be indicated to XR server 132 (e.g., a haptic experience parameter may comprise directional movement such as rightward movement of an appliance 117, leftward movement, upward movement, downward movement, an eyeblink movement, a movement of a user's mouth or other body part, pressing a control item, such as a button, and the like). Information indicated in field 515 may be indicative of multiple possibilities of the XR haptic experience information that can be generated, compiled, determined, or transmitted by active XR application 301 with respect to multiple haptic experiences experienced by multiple XR appliances 117A-117n shown in FIG. 3.

Responsive to receiving information message 320, RAN node 105 may determine, generate, compile, or otherwise assemble extended reality haptic experience quantization configuration information 325 that is based at least on extended reality application 301 that may be indicated to the RAN node via message 310 and that the RAN node may indicate to XR server 132 via request message 315. As shown in FIG. 6, extended reality haptic experience quantization configuration information 325 may comprise in column 605 multiple values associated with multiple possible haptic experience combinations shown in field 610, which may be based on information indicated in field 515 of message 320. Although for purposes of example column 605 shows two quantization values (e.g., field 605D shows a first 2 and a second 2), various, and more, haptic control combinations than those shown in column 610 may be accommodated by using more than two haptic quantization levels, or values, as shown in fields A-D of column 605. Thus, extended reality haptic experience quantization configuration information 325 may be based at least on extended reality application 301 and QoS profile information, capability, or other characteristics corresponding to the application, processing unit 115, or one or more appliances 117. RAN node 105 may transmit extended reality haptic experience quantization configuration information 325 via a message to extended reality processing unit 115.

In an example embodiment, XR server 132 may determine or generate extended reality haptic experience quantization configuration information 325 and thus information message 320 may comprise the extended reality haptic experience quantization configuration information.

RAN node 105 may transmit message 325 toward extended reality intermediate processing unit 115 via downlink radio interface link(s) 125 as part of DCI or RRC signaling. As shown in FIG. 6, message 325 may comprise at least one quantization value 605 indicative of at least one possible combination 610 of haptic experience parameters indicated via message 320 and a number of appliances 117 that are interacting with application 301. In an example embodiment, processing unit 115 may make RAN node 105 aware of a number of appliances 117 that are interacting with application 301. In another example embodiment, RAN node 105 may make XR server 132 aware of a number of appliances 117 that are interacting with application 301, in which case the XR server may determine quantization information 325 which, as described above, may be included in message 320. As shown in FIG. 6, a haptic experience quantization value of '12' shown in field 605B may correspond to rightward movement 317A of appliance 117A and leftward movement 317B of appliance 117B, as shown in FIG. 3. It will be appreciated that although RAN node 105 may have an awareness of a number of appliances 117 that are interacting with application 301, the RAN node may nevertheless be unaware of which appliance(s) 117 perform(s), or experience(s), haptic motion or manipulation.

Processing unit 115 may receive, via inter-device link(s) 135/137 from end XR appliance(s) 117, and decode, haptic control information message(s) 330. Intermediate processing unit 115 may determine aggregate haptic quantization value(s) (e.g., values indicated in column 605 of configuration information 325) that match(es) a combination of multiple end XR appliance experience(s) indicated by haptic control information in message(s) 330. For example, when receiving indications of rightward movement and leftward movement corresponding to XR appliances 117A and 117B, XR processing unit 115 may search quantization information 325, which may be in the form of a code-book or mapping list, to determine a haptic quantization value, or values, for example, '12,' that matches the haptic experiences indicated in message(s) 330.

Figure 7:
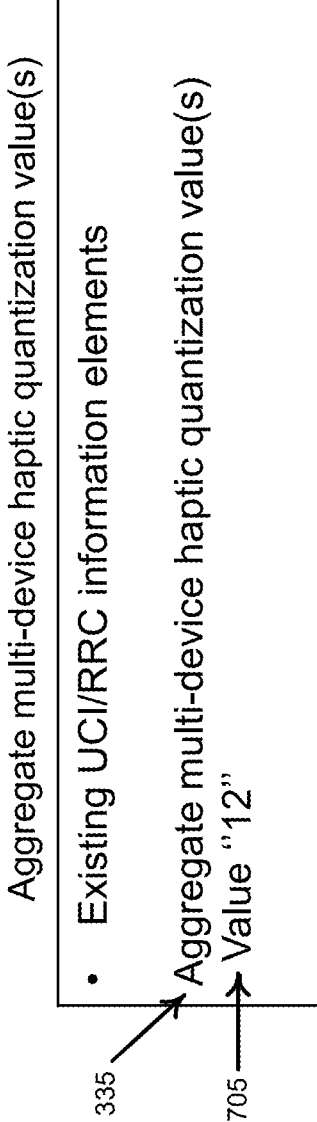
FIG. 7 illustrates example extended reality quantized haptic experience indication information.

Responsive to, for example, indication(s) via message(s) 330 of rightward movement 317A of appliance 117A and leftward movement 317B of appliance 117B, XR processing unit 115 may generate quantized haptic experience indication 335, shown in FIG. 7, indicative of movements 317A and 317B corresponding to appliances 117A and 117B. However, indication 335 may not be indicative of identifiers corresponding to appliances 117A and 117B. In an embodiment, an order of one or more values indicated by indication 335 may correspond to which of appliances 117A and 117B performed haptic movements 317A and 317B. XR processing unit 115 may transmit quantized haptic experience indication 335 to RAN node 105. XR Processing unit 115 may transmit the determined aggregate multi-device haptic quantization value(s), via quantized haptic experience indication 335, toward serving RAN node 105 via uplink radio interface link(s) 125.

Accordingly, due to XR processing unit 115 'scraping' (e.g., avoiding attaching or including in message 335) one or more appliance identifiers corresponding to end XR appliances that experienced haptic experiences indicated in message 330, use of a significant amount uplink control channel capacity may be reduced because an identifier corresponding to an appliance 117 may be up to sixteen bytes which is much larger than two bits, or several bits, that may be used to indicate a quantization value in field 605 shown in FIG. 6. However, RAN node 105 may only be made aware that one end XR appliance (e.g., 117A) has executed/experienced a rightward movement (e.g., 317A) while another appliance (e.g., 117B) has as executed/experienced a leftward movement (e.g., 317B) and may not be aware of which appliance experienced which haptic movement.

RAN node 105 may request, via indication message 335 from XR server 132, reactive traffic responsive to haptic movements 317A and 317B indicated by quantized haptic experience indication 335 and may schedule at least one downlink resource (e.g., at least one downlink frequency or time resource) to facilitate transmitting reactive traffic to XR processing unit 115. RAN node 105 may receive reactive traffic 340, directed to the node by XR server 132, and the node may transmit the reactive traffic to XR processing unit 115. Reactive traffic 340 may be devoid of, or may not include, an indication of one or more of appliances 117 to which the reactive traffic is directed. In an embodiment, reactive traffic may identify, or otherwise correspond to, a particular value, or location or order of a value, indicated by message 335. XR processing unit 115 may, based on having generated, compiled, or otherwise determined one or more values, and in an embodiment the order thereof, indicated by indication 335, determine to which one or more appliances 117 one or more portion(s) of the reactive traffic 340 is to be directed and may direct the reactive traffic thereto (e.g., reactive traffic 340A may be directed to appliance 117A and reactive traffic 340B may be directed appliance 117B). By using quantized values to indicate, in indication 335, haptic experiences corresponding to one or more appliances 117, a size of control traffic messaging, for example, indication message 335, may comprise fewer bits or bytes than if each of one or more appliances 117 were indicated and identified as uniquely corresponding to respective haptic experience movements or manipulations. (A unique identifier corresponding to one or more appliances 117 may comprise more bytes than may be used by a value 605 to represent one or more haptic experiences corresponding to one or more appliances.)

After RAN node 105 receives real-time aggregate multi-device haptic quantization levels/values indicated via message 335, the RAN node is not aware of which specific end XR appliance 117 has executed which of the haptic movements indicated by the value, or values, in message 335. In the example described with respect to haptic movements 317A and 317B, RAN node 105 may only be aware that an appliance 117 has executed a right-hand control movement and that another appliance has executed a left-hand movement. A determination of which appliance 117 actually performed haptic movement 317A and/or 317B may only be made by intermediate unit 115 due to identification information, corresponding to appliances 117A and 117B, not being indicated by message 335 to facilitate reduction of radio resources used to facilitate uplink signaling/transmission of indication message 335.

Accordingly, RAN node 105 may schedule resources for delivery of reactive traffic 340 and may blindly deliver the reactive downlink traffic toward XR processing unit 115 in response to the received quantized XR haptic information indicated by message 335 without being aware of which end XR appliance 117 the scheduled one or more downlink traffic flows are to be delivered. Such blind delivery may be referred to as device/appliance-transparent traffic scheduling and delivery. Thus, in response to receiving message 335, after receiving reactive traffic 340, which may comprise traffic directed by XR server 132 to appliance 117A and appliance 117B, RAN node 105 may transmit one or more downlink traffic flows, corresponding to a value indicated in field 705 shown in FIG. 7 and directed to one or more appliances 117 (e.g., multi-modal downlink traffic), towards intermediate XR processing unit 115 without 'knowing' to which appliance(s) the traffic is directed.

Responsive to transmitting message 335, XR processing unit 115 may receive and decode reactive multi-modal downlink traffic flow traffic 340, that may be delivered by XR server 132 in reaction to information indicated by message 335. RAN node 105 may deliver reactive downlink traffic 340, which may comprise traffic directed to more than one XR appliance 117, to extended reality processing unit 115 without the RAN node being aware of, or identifying, which traffic flow corresponds to which specific end XR device appliance 117 because the RAN node does not have information indicative of which end XR appliance quantized haptic information indicated by message 335 corresponds. Accordingly, determination of which end XR appliance(s) 117 traffic 340 corresponds to is not performed by RAN node 105 and instead is performed locally by extended reality intermediate processing unit 115. Intermediate processing unit 115 may determine association of received multimodal downlink traffic 340 and corresponding end XR appliance(s) 117 based on haptic experience behavior known by the XR processing unit, (e.g., the end XR processing unit receives message(s) 330 indicative of XR appliance(s) that experienced the haptic experience behavior). Intermediate processing unit 115 may relay/transmit, via inter-device link(s) 135/137 toward one or more end XR appliance(s) 117, respective downlink multimodal traffic, which may be included in reactive traffic 340, according to which appliance the reactive traffic corresponds.

Figure 8:
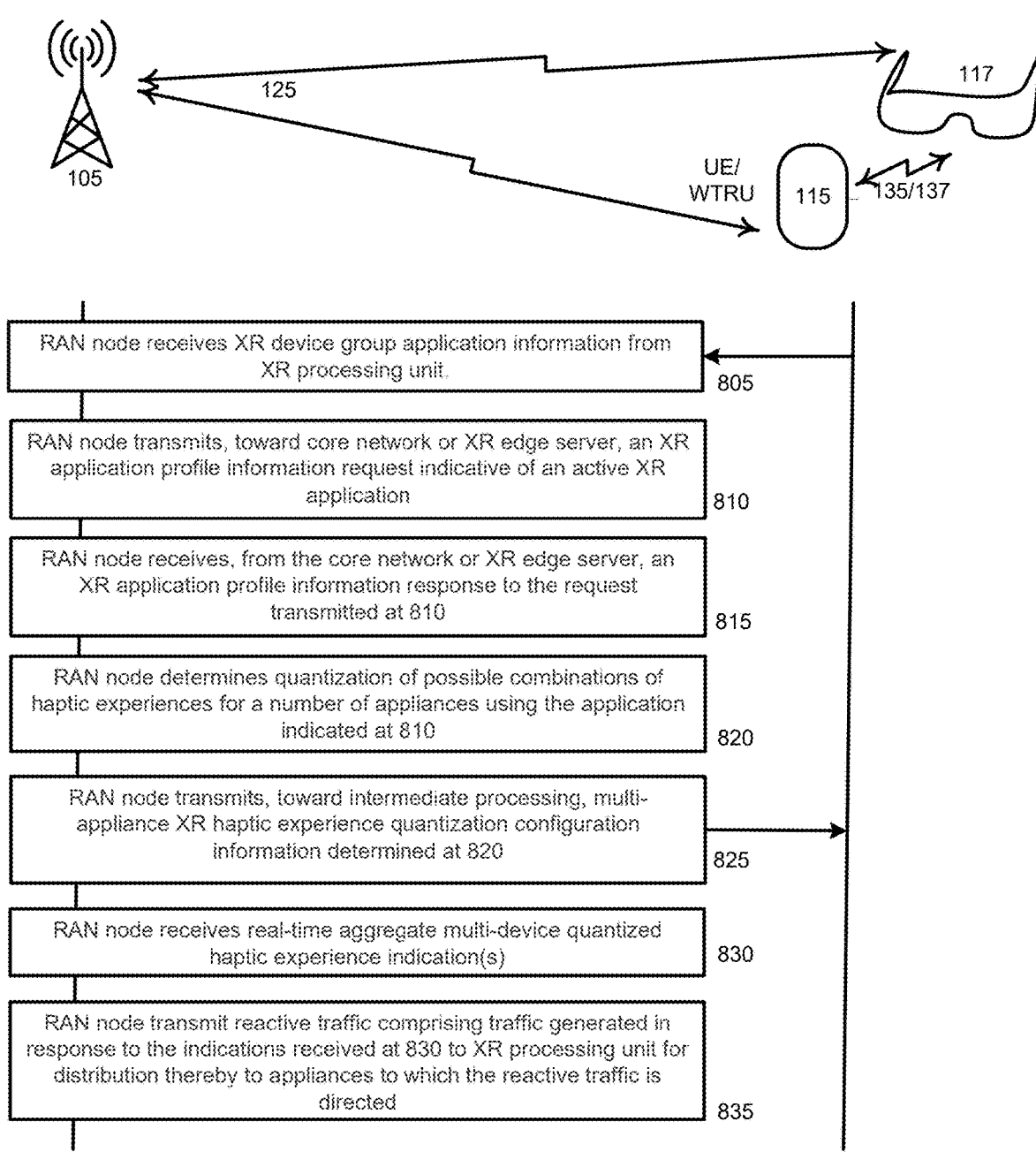
FIG. 8 illustrates a timing diagram of an example embodiment of a radio network node facilitating an extended reality session using quantized haptic experience information.

Turning now to FIG. 8, the figure illustrates a timing diagram of an example embodiment method 800 of radio network node 105 facilitating an extended reality session, via processing unit 115, with at least one extended reality appliance 117. At act 805, RAN node 105 may receive via at least one uplink radio interface link(s) 125 from XR processing unit 115 as an uplink control information ("UCI") or uplink radio resource control ("RRC") signaling, XR device group application information, for example, message 310 described in reference to FIG. 3. The information received at act 805 may comprise identifiers corresponding to one or more end XR appliance(s) 117 that may be connected to, or that may be participating in, an active XR session. Information received at act 805 may comprise an identifier associated with an XR application (e.g., application 301 described in reference to FIG. 3) with respect to which the appliance(s) 117 may be using to facilitate the XR session. At act 810, RAN node 105 may transmit, toward a core network entity 130 or toward an XR edge server 132 via backhaul interface link(s), an XR application profile information request (e.g., request 315 described in reference to FIG. 3), indicative of an XR application (e.g., the indication may be an identifier associated with the application or application type).

At act 815, RAN node 105 may receive, from a core network entity or from the XR edge server via backhaul interface link(s), an XR application profile information response (e.g., message 320 described in reference to FIG. 3) that may comprise XR application support indication. Message 320 may comprise indication(s) of one or more possible XR application haptic experience motions or manipulations that may be indicated by control information elements (e.g., right hand movement, left hand movements, up movement, down movement, and the like). At act 820, based on information received at act 815, RAN node 105 may generate or determine at least one quantization level, or value, corresponding to possible combinations of haptic experience motions or manipulations that may be indicated by message 320 received at act 815 (e.g., for two appliances using the XR application indicated at act 805 and two possible haptic movements per device, four possible unique quantization levels, or values, may be determined to uniquely correspond to possible combinations of haptic experiences and a number of appliances actively using the XR application).

At act 825, RAN node may transmit, toward intermediate processing unit 115 via downlink radio interface link(s) 125, as part of DCI or RRC signaling, XR multi-device quantization profile of the XR haptic information (e.g., message 325), indicative of quantization level(s)/value(s) associated with possible combination(s) of haptic experience movements or manipulations, performable by, or experienceable by, the active end XR appliance 117. For example, a haptic quantization value of '11' (e.g., as shown in field 605A of FIG. 6) may be indicative of two active end XR appliances 117 both executing, or experiencing, a right-hand haptic movement). At act 830, RAN node 105 may receive real-time aggregate multi-device haptic quantization level(s)/value(s), indicated via a message 335 received via uplink radio interface link(s), during an active XR session. At act 835, RAN node 105 may transmit one or more downlink flows of reactive traffic that comprise(s) traffic generated in reaction to the quantization value(s) indicated at act 830. The reactive traffic may be transmitted toward intermediate processing unit 115 (but may comprise traffic intended to reach one or more end XR appliance 117) in reaction to haptic quantization information indicated at act 830 (e.g., the reactive traffic may comprise multi-modal downlink traffic relative to received uplink haptic control information indicated at act 830).

Turning now to FIG. 9, the figure illustrates a timing diagram of an example embodiment method 900 of extended processing unit 115 facilitating an extended reality session between RAN node 105 and at least one extended reality appliance 117. At act 905, XR processing unit 115 may transmit, toward serving RAN node 105 via uplink radio interface link(s) as an uplink control information or uplink radio resource control signaling, for example, via a message 310 described in reference to FIG. 3. The XR device group application information transmitted via message 310 may comprise one or more identifiers corresponding to one or more end XR appliances 117 that may be connected to, or that may be participating in, an active XR session. Information transmitted via message 310 may comprise an identifier of an XR application or an XR application profile corresponding thereto.

At act 910, intermediate XR processing unit 115 may receive, from serving RAN node 105 via downlink radio interface link(s) as part of DCI or RRC signaling, XR multi-device quantization configuration information (e.g., XR haptic experience quantization configuration information 325 as shown in FIG. 6) corresponding to combinations of haptic movements or manipulations that may be experienced by the one or more appliances 117. For example, a haptic quantization level/value indication of '11' shown in field 605A may be indicative of two active end XR appliances both experiencing rightward haptic movement.

At act 915, intermediate processing unit 115 may receive and decode haptic control information received from end XR appliances via inter-device link(s) (e.g., the processing unit may receive at least one message 330). At act 920, intermediate processing unit 115 may determine at least one aggregate haptic quantization level/value, from column 605 of configuration information received 325 at act 910, that matches a combination, indicated by the at least one message 330, of haptic experience(s) corresponding to one or more appliances 117. At act 920, intermediate processing unit 115 may transmit the determined aggregate multi-device haptic quantization level indication (e.g., indication message 335) toward serving RAN node 105 via uplink radio interface link(s).

At act 925, intermediate processing unit 115 may receive and decode multi-modal reactive downlink traffic flows, generated in reaction to the quantized haptic indication(s) transmitted at act 920. At act 930, intermediate XR processing unit 115 may determine an association of reactive traffic received at act 925 with one or more end XR appliances to which the reactive traffic is directed based on known per-device haptic behavior (e.g., based on the at least one message 330 received from at least one applicant 117 by the XR processing unit at act 915). At act 935, intermediate processing unit 115 may relay/transmit, via inter-device link(s) 135/137, portion(s) of the reactive traffic corresponding to one or more appliances 117 according to which devices the portion(s) correspond.

Figure 10:
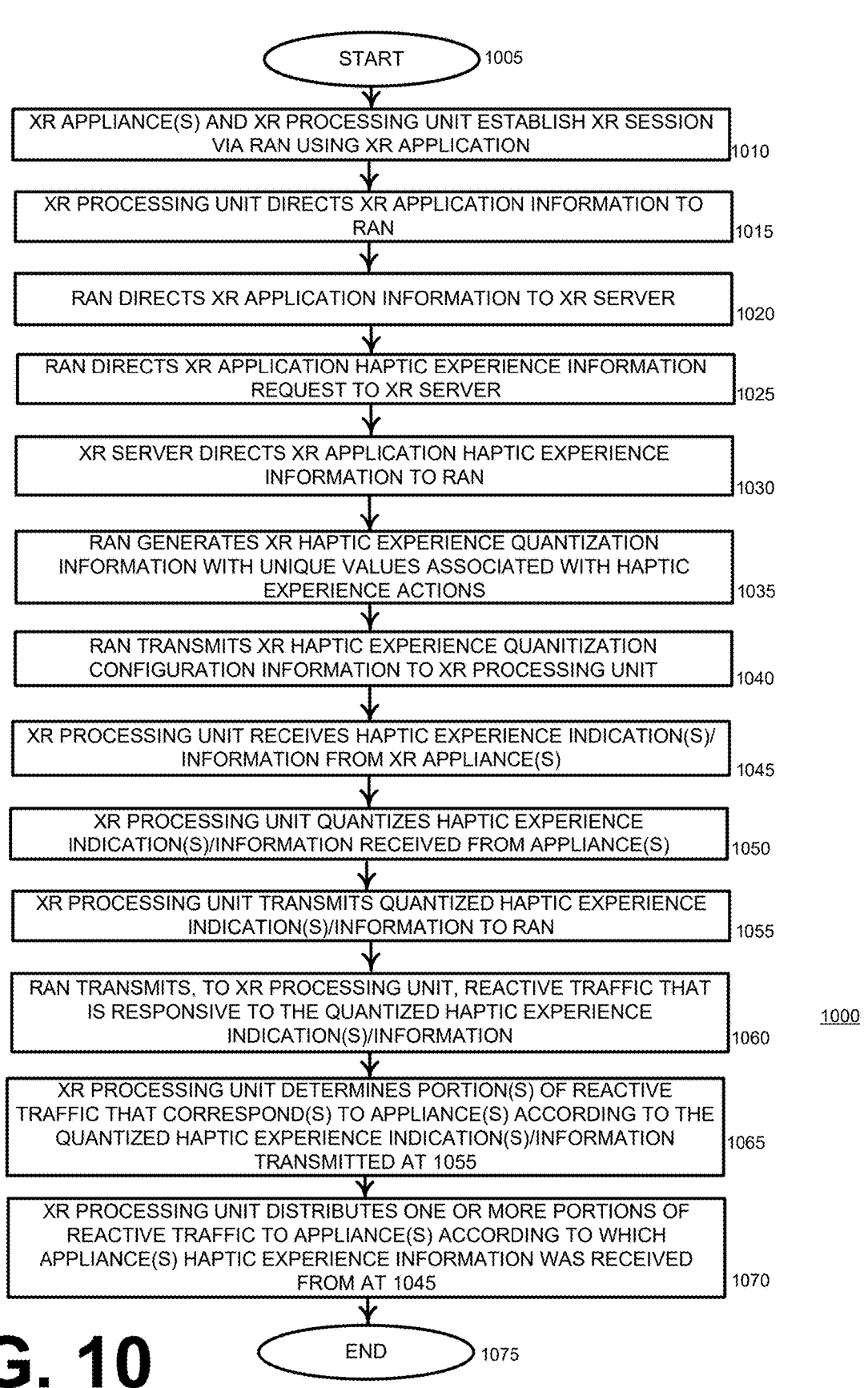
FIG. 10 illustrates a flow diagram of an example embodiment method using quantized haptic experience information to facilitate an extended reality session.

Turning now to FIG. 10, the figure illustrates a flow diagram of an example embodiment 1000. Method 1000 begins at act 1005. At act 1010, at least one extended reality appliance and an extended reality processing unit may establish an extended reality session. The extended reality session may be established with respect to an extended reality server and a radio network node may facilitate communication between an XR appliance or the XR processing unit and the XR server. At act 1015, the XR processing unit may direct XR application information to the radio network node. The XR application information may comprise an identifier associated with an XR application used by the XR processing unit or the at least one XR appliance to facilitate the XR session. The XR application information may comprise information indicative of a capability associated with the at least one XR appliance or associated with the XR processing unit. At act 1020, the radio network node may direct XR application information received from the XR processing unit at act 1015 to the XR server. At act 1025, the radio network node may direct an extended reality application haptic experience information request to the XR server. The haptic experience information request may comprise a request for haptic movements, manipulation, or action by an XR appliance that may be facilitated, accommodated, executable, or otherwise performable with respect to the extended reality application. Responsive to the haptic experience information request directed to the XR server at act 1025, at act 1030 the XR server may direct XR application haptic experience information to the radio network node.

At act 1035, the radio network node may determine, generate, or otherwise create extended reality haptic experience quantization information. The extended reality haptic experience quantization information may comprise one or more unique values respectively associated with one or more extended reality application haptic experience actions indicated by the extended reality application haptic experience information received from the extended reality server at act 1030. (E.g., unique values in column 605 shown in FIG. 6 are respectively associated with corresponding haptic experience action combinations indicated in field 610.) At act 1040, the radio network node may transmit, to the extended reality processing unit, the extended reality haptic experience quantization information, generated at act 1035, as extended reality haptic experience quantization configuration information.

At act 1045, the extended reality processing unit may receive haptic experience information from one or more XR appliances (e.g., appliances 117A and 117B shown in FIG. 3) indicative of haptic actions corresponding to the appliances (e.g., action 317A and 317B). The haptic experience information received at act 1045 may be received via one or more message(s) 330 described in reference to FIG. 3. At act 1050, the extended reality processing unit may, using assemble extended reality haptic experience quantization configuration information 325, quantize haptic experience actions indicated by the information received XR appliance(s) at act 1045. For example, if message 330A as shown in FIG. 3 indicates rightward movement 317A and if message 330B indicates leftward movement 317B, as shown in FIG. 7 the extended reality processing unit may quantize the rightward and leftward movement actions as '12.' At act 1055, the extended reality processing unit may transmit the quantized haptic experience indication(s), or information(s), to the radio network node, for example, via message 335 as described in reference to FIG. 3.

At act 1060, responsive to the quantized haptic experience indication message transmitted at act 1055, the radio network node may transmit to the extended reality processing unit reactive traffic that comprises traffic that corresponds to the haptic experience actions indicated by the quantized haptic experience indication information transmitted at 1055. It will be appreciated that the XR server may generate the reactive traffic based on indications of haptic experience actions indicated by the appliances via one or more messages 330. Reactive traffic may be linked to, or may correspond to, haptic experience actions indicated by the quantized haptic experience indications based on an order of quantization values indicated in a message 335 and may be determined by the XR server based on information associated with the haptic experiences and previous haptic experiences, corresponding to the appliance(s) that transmitted message(s) 330, that may have been indicated to, and reacted to by, the XR server.

At act 1065, the extended reality processing unit may determine one or more portions of reactive traffic transmitted by the radio network noted act 1060 that respectively corresponds to one or more XR appliances 117. The extended reality processing unit may determine which appliance 117 a portion of the reacted traffic corresponds to an order of values indicated in a quantized haptic experience indication message transmitted at act 1055. For example, the extended reality processing unit may designate appliance 117A as device one and appliance 117B as device 2 as shown in the heading of column 610 in FIG. 6. Accordingly, reactive traffic 340 shown in FIG. 3, received by the extended processing unit from the radio network node may comprise reactive traffic portion 340A, which may be directed to appliance 117A, preceding reactive traffic portion 340B, which may be directed to appliance 117B. Accordingly, based on the associations between appliance 117A with respect to device 1 and between appliance 117B with respect to device 2, as described in reference to FIG. 6 the extended reality processing unit may determine to distribute at act 1070 reactive traffic portion 340A to appliance 117A and reactive traffic portion 340B to appliance 117B. Method 1000 ends at act 1075.

It will be appreciated that although quantization values shown in column 605 of FIG. 6 are illustrated as Arabic numerals, binary representations that comprise enough bits to represent the possible combinations of haptic experiences that may be indicated by the XR server to the radio network node at act 1030 and a number of appliances 117 that may be participating in an XR session established at act 1010 may be used. Even if more than two appliances as shown in the example in FIG. 3 participate in and XR session and more than just right, left, up, or down haptic actions are indicated at act 1030, the number of bits needed to represent the possible combinations will likely be less than the number of bits needed to identify a particular appliance according to a conventional user equipment identifier, for example, an IMSI. For example, haptic experience actions indicated by the XR server to the XR processing unit at act 1030 may comprise right, left, up, down, or no action, resulting in five possible haptic experience actions being indicated. If three appliances 117 are participating in an XR session, quantization values indicated in column 605 shown in FIG. 6 may comprise enough bits to uniquely represent fifteen different haptic experience/appliance combinations. Accordingly, four bits instead of up to 192 bits (sixty-four bits for each of the three appliances) for three IMSI identifiers could be used by the extended reality processing unit to uniquely represent to the radio network node the fifteen different haptic experience/appliance combinations corresponding to the three appliances thus reducing uplink control channel capacity used to indicate by the extended reality processing unit to the radio network node the haptic experience/appliance combinations.

Turning now to FIG. 11, the figure illustrates an example embodiment method 1100 comprising at block 1105 facilitating, by radio network equipment comprising at least one processor, receiving, from at least one user equipment, extended reality application information comprising an application indication indicative of an extended reality application with respect to which at least one extended reality appliance, communicatively coupled with the at least one user equipment, is capable of using to facilitate an extended reality session; at block 1110 facilitating, by radio network node equipment, transmitting, to the at least one user equipment, extended reality haptic experience quantization configuration information that is based at least on the extended reality application; at block 1115 facilitating, by the radio network node equipment, receiving, from the at least one user equipment, at least one quantized haptic experience indication indicative of at least one haptic experience corresponding to the at least one extended reality appliance; and at block 1120 facilitating, by the radio network node equipment, transmitting, to the at least one user equipment, reactive traffic corresponding to the at least one haptic experience.

Turning now to FIG. 12, the figure illustrates a radio network node, comprising at block 1205 at least one processor configured to process executable instructions that, when executed by the at least one processor, facilitate performance of operations, comprising receiving, from an extended reality processing unit, extended reality application information comprising an application indication indicative of an extended reality application with respect to which a first extended reality appliance and a second extended reality appliance, communicatively coupled with the extended reality processing unit, are capable of using to facilitate an extended reality session; at block 1210 responsive to receiving the extended reality application information, transmitting, to the extended reality processing unit, haptic experience quantization configuration information that is based on the extended reality application information; at block 1215 receiving, from the extended reality processing unit, at least one quantized haptic experience indication indicative of at least one haptic experience corresponding to at least one of the first extended reality appliance or the second extended reality appliance, wherein the haptic experience quantization configuration information comprises the at least one quantized haptic experience indication; and at block 1220 transmitting, to the extended reality processing unit, reactive traffic corresponding to the at least one haptic experience.

Turning now to FIG. 13, the figure illustrates a nontransitory machine-readable medium 1300 comprising at block 1305 executable instructions that, when executed by at least one processor of radio network equipment, facilitate performance of operations, comprising, receiving, from an extended reality processing unit, extended reality application information comprising an application indication indicative of an extended reality application with respect to which at least one extended reality appliance, communicatively coupled with the extended reality processing unit, is capable of using to facilitate an extended reality session with respect to core network equipment, associated with a core network, that is configured to facilitate the extended reality session; at block 1310 responsive to receiving the extended reality application information, directing, to the core network equipment, an extended reality application haptic experience configuration information request comprising a request for extended reality application haptic experience configuration information corresponding to the extended reality application; at block 1315 responsive to the extended reality application haptic experience configuration information request, receiving, from the core network equipment, the extended reality application haptic experience configuration information; at block 1320 receiving, from the extended reality processing unit, a quantized haptic experience indication indicative of at least one haptic experience, indicated by the extended reality application haptic experience configuration information and corresponding to the at least one extended reality appliance; at block 1325 receiving, from the core network equipment, reactive traffic corresponding to the at least one haptic experience indicated by the quantized haptic experience indication; at block scheduling at least one downlink radio resource usable to facilitate delivery of the reactive traffic to the extended reality processing unit to result in at least one scheduled downlink radio resource; and at block 1335 transmitting, to the extended reality processing unit according to the at least one scheduled downlink radio resource, the reactive traffic.

Turning now to FIG. 14, the figure illustrates an example embodiment method 1400 comprising at block 1405 receiving, by at least one user equipment comprising at least one processor from at least one extended reality appliance, at least one haptic experience indication indicative of at least one haptic experience corresponding to the at least one extended reality appliance; at block 1410 transmitting, by the at least one user equipment to radio network node equipment, at least one quantized haptic experience indication indicative of the at least one haptic experience; at block 1415 responsive to the transmitting of the at least one quantized haptic experience indication, receiving, by the at least one user equipment from the radio network node, reactive traffic that corresponds to the at least one haptic experience; at block 1420 based on the at least one haptic experience indication, determining, by the at least one user equipment, at least one of the at least one extended reality appliance to which the reactive traffic is directed, to result in at least one determined extended reality appliance; and at block 1425 transmitting, by the at least one user equipment to the at least one determined extended reality appliance, the reactive traffic.

Turning now to FIG. 15, the figure illustrates a extended reality processing unit, comprising at block 1505 at least one processor configured to process executable instructions that, when executed by the at least one processor, facilitate performance of operations, comprising receiving, from at least one extended reality appliance, at least one haptic experience indication indicative of at least one haptic experience corresponding to at least one extended reality appliance with respect to which the extended reality processing unit is facilitating a communication session, via a radio network node, according to at least one extended reality application being executed by the at least one extended reality appliance; at block 1510 quantizing the at least one haptic experience to result in a quantized haptic experience indication; at block 1515 transmitting, to the radio network node, the quantized haptic experience indication; at block 1520 responsive to the transmitting of the quantized haptic experience indication, receiving, from the radio network node, reactive traffic that corresponds to the at least one haptic experience; at block 1525 based on the at least one haptic experience indication, determining at least one of the at least one extended reality appliance to which the reactive traffic is directed, to result in at least one determined extended reality appliance; and at block 1530 transmitting, to the at least one determined extended reality appliance, the reactive traffic.

Turning now to FIG. 16, the figure illustrates a nontransitory machine-readable medium 1600 comprising at block 1605 executable instructions that, when executed by at least one processor of an extended reality processing unit, facilitate performance of operations, comprising, transmitting, to radio network equipment, extended reality application information comprising an application indication indicative of an extended reality application with respect to which at least one extended reality appliance, communicatively coupled with the extended reality processing unit, is configured to use to facilitate an extended reality session with an extended reality server; at block 1610 responsive to the transmitting of the extended reality application information, receiving, from the radio network equipment, extended reality application haptic experience quantization configuration information usable to quantize at least one haptic experience, indicated by the at least one extended reality appliance to the extended reality processing unit and corresponding to operation by the at least one extended reality appliance with respect to the extended reality application; at block 1615 receiving, from the at least one extended reality appliance, at least one haptic experience indication indicative of the at least one haptic experience; at block 1620 transmitting, to the radio network equipment, a quantized haptic experience indication indicative of the at least one haptic experience; at block 1625 responsive to the transmitting of the quantized haptic experience indication, receiving, from the radio network equipment, reactive traffic that corresponds to the at least one haptic experience; at block 1630 based on the at least one haptic experience indication, determining at least one of the at least one extended reality appliance to which the reactive traffic is directed to result in at least one determined extended reality appliance; and at block 1635 transmitting, to the at least one determined extended reality appliance, the reactive traffic.

Figure 17:
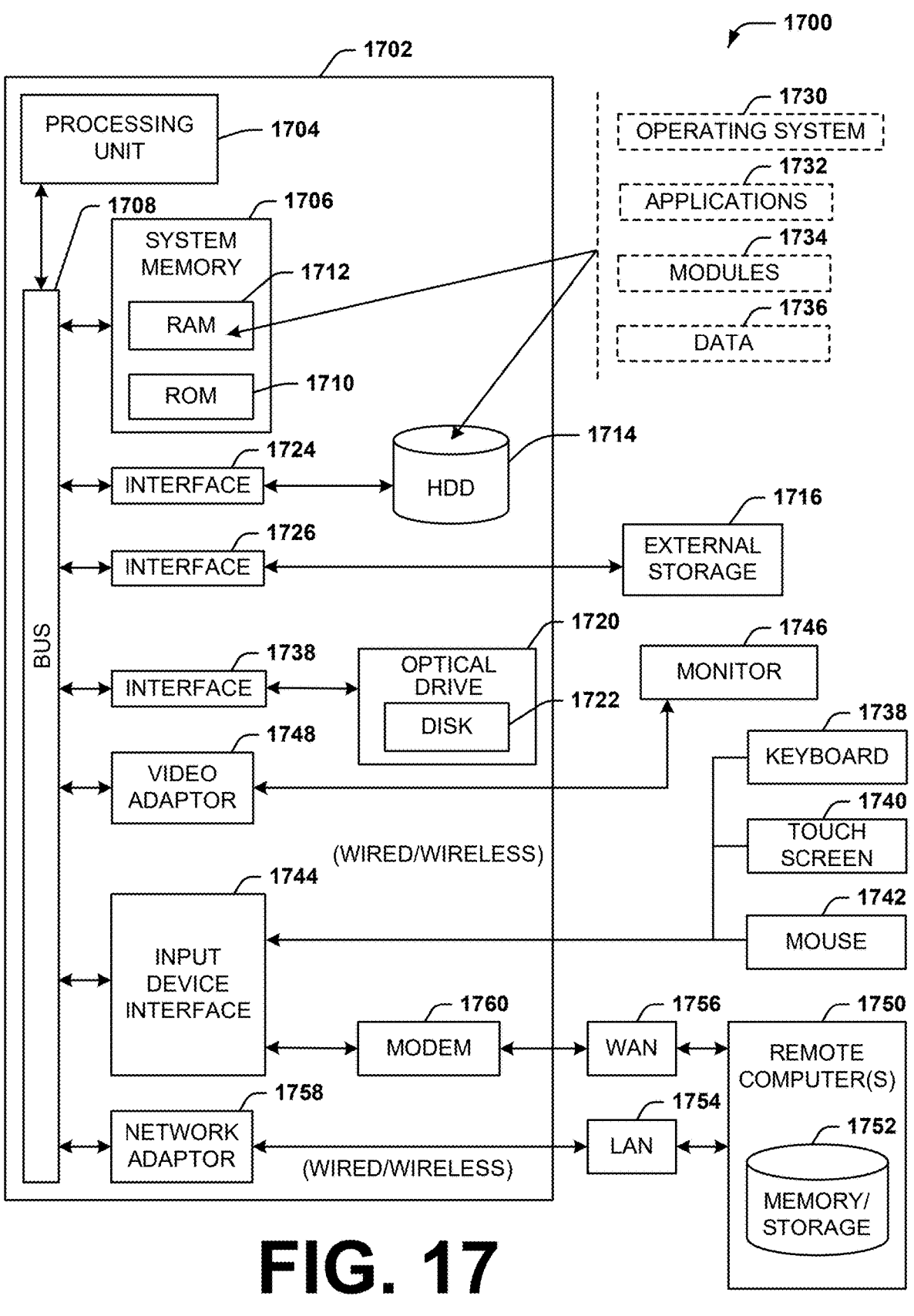
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and nonremovable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are examples and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
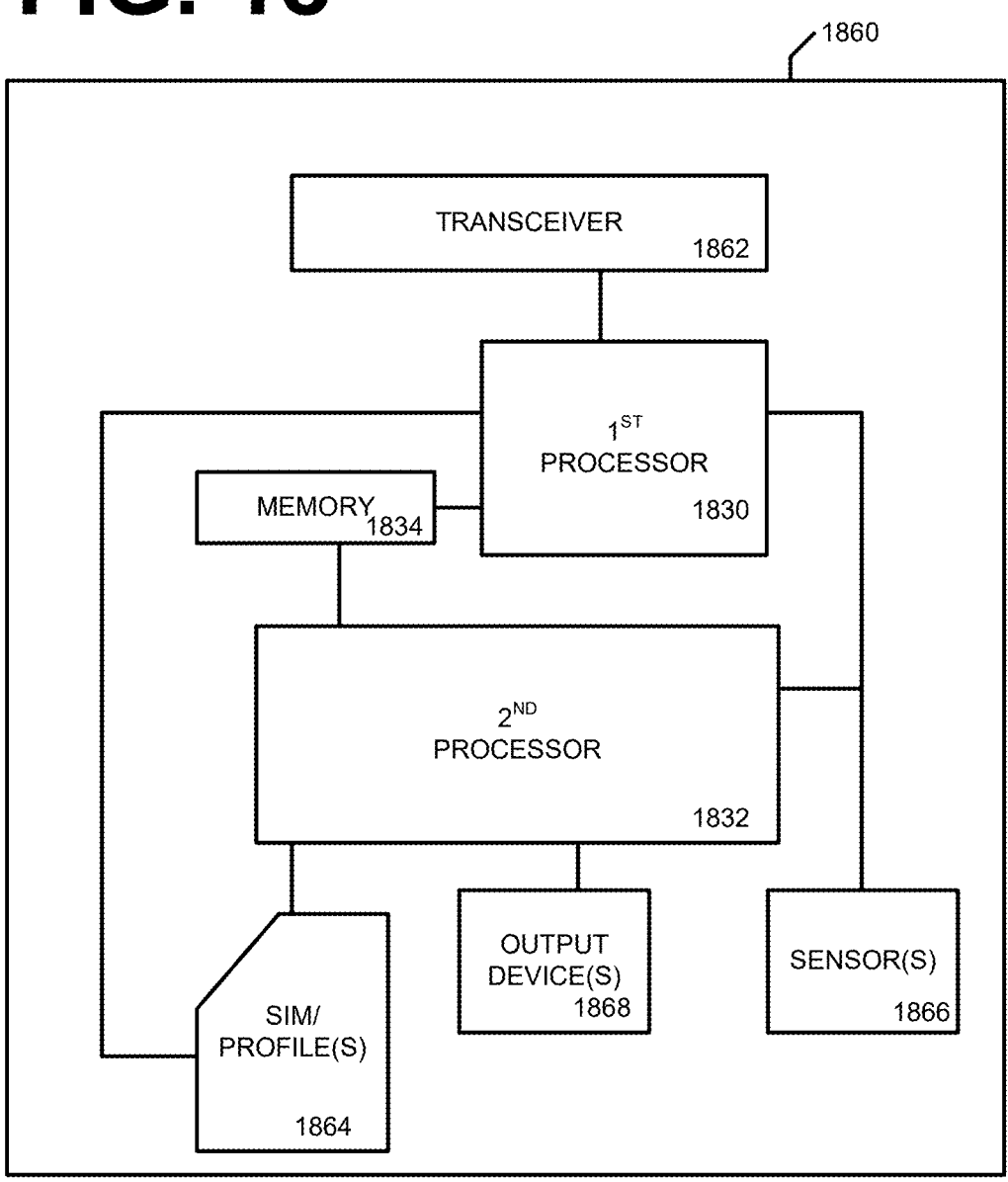
FIG. 18 illustrates a block diagram of an example wireless user equipment.

Turning now to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or baseband processor, is shown smaller than processor 1832, which may be a more sophisticated application processor, to visually indicate the relative levels of sophistication (i.e., processing capability and performance) and corresponding relative levels of operating power consumption levels between the two processor portions. Keeping the second processor portion 1832 asleep/inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, that are external to UE 1860.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |

TABLE 1-continued

| Term | Definition |
| --- | --- |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by radio network node equipment comprising at least one processor, receiving, from at least one user equipment, extended reality application information comprising an application indication indicative of an extended reality application with respect to which at least one extended reality appliance, communicatively coupled with the at least one user equipment, is capable of using to facilitate an extended reality session;

facilitating, by the radio network node equipment, transmitting, to the at least one user equipment, extended reality haptic experience quantization configuration information that is based at least on the extended reality application;

facilitating, by the radio network node equipment, receiving, from the at least one user equipment, at least one quantized haptic experience indication indicative of at least one haptic experience corresponding to the at least one extended reality appliance; and facilitating, by the radio network node equipment, transmitting, to the at least one user equipment, reactive traffic corresponding to the at least one haptic experience.

2. The method of claim 1, further comprising:

responsive to receiving the extended reality application information, directing, by the radio network node equipment to extended reality server computing equipment, an extended reality application haptic experience information request comprising a request for extended reality application haptic experience information corresponding to the extended reality application; and responsive to the extended reality application haptic experience information request, facilitating, by the radio network node equipment, receiving the extended reality application haptic experience information directed, by the extended reality server computing equipment, to the radio network node equipment.

3. The method of claim 2, wherein the extended reality application haptic experience information comprises the extended reality haptic experience quantization configuration information.

4. The method of claim 2, further comprising:

generating, by the radio network node equipment, at least one quantization value corresponding to the extended reality application haptic experience information; and associating the at least one quantization value with the extended reality application haptic experience information to result in the extended reality haptic experience quantization configuration information.

5. The method of claim 1, wherein the extended reality haptic experience quantization configuration information comprises at least one haptic experience value being uniquely associated with the at least one haptic experience.

6. The method of claim 1, wherein the at least one quantized haptic experience indication comprises a first quantized haptic experience indication indicative of a first haptic experience or a second quantized haptic experience indication indicative of a second haptic experience, wherein the reactive traffic comprises first reactive traffic that corresponds to the first haptic experience or second reactive traffic that corresponds to the second haptic experience, and wherein the reactive traffic excludes information indicative of the at least one extended reality appliance.

7. The method of claim 1, wherein the at least one quantized haptic experience indication comprises a first quantized haptic experience indication indicative of a first haptic experience or a second quantized haptic experience indication indicative of a second haptic experience, and wherein the first quantized haptic experience indication and the second quantized haptic experience indication exclude information indicative of the at least one extended reality appliance.

8. The method of claim 1, wherein the at least one quantized haptic experience indication is indicative of at least one movement direction of at least one of the at least one extended reality appliance or at least one manipulation of at least one control interface item corresponding to the at least one extended reality appliance.

9. The method of claim 1, wherein the at least one quantized haptic experience indication comprises a first quantized haptic experience indication indicative of a first haptic experience corresponding to the at least one extended reality appliance and a second quantized haptic experience indication indicative of a second haptic experience corresponding to the at least one extended reality appliance.

10. The method of claim 9, wherein the first quantized haptic experience indication comprises a first value indicative of the first haptic experience, wherein the second quantized haptic experience indication comprises a second value indicative of the second haptic experience, and wherein the extended reality haptic experience quantization configuration information comprises a first association of the first value with the first haptic experience and a second association of the second value with the second haptic experience.

11. The method of claim 9, wherein the first haptic experience corresponds to a first extended reality appliance, wherein the second haptic experience corresponds to a second extended reality appliance, wherein the first quantized haptic experience indication excludes first information indicative of the first extended reality appliance and the second quantized haptic experience indication excludes second information indicative of the second extended reality appliance, wherein the reactive traffic comprises first reactive traffic that corresponds to the first haptic experience and second reactive traffic that corresponds to the second haptic experience, and wherein the reactive traffic excludes third information indicative of the first extended reality appliance or the second extended reality appliance.

12. A radio network node, comprising at least one processor configured to process executable instructions that, when executed by the at least one processor, facilitate performance of operations, comprising:

receiving, from an extended reality processing unit, extended reality application information comprising an application indication indicative of an extended reality application with respect to which a first extended reality appliance and a second extended reality appliance, communicatively coupled with the extended reality processing unit, are capable of using to facilitate an extended reality session;

responsive to receiving the extended reality application information, transmitting, to the extended reality processing unit, haptic experience quantization configuration information that is based on the extended reality application information;

receiving, from the extended reality processing unit, at least one quantized haptic experience indication indicative of at least one haptic experience corresponding to at least one of the first extended reality appliance or the second extended reality appliance, wherein the haptic experience quantization configuration information comprises the at least one quantized haptic experience indication; and transmitting, to the extended reality processing unit, reactive traffic corresponding to the at least one haptic experience.

13. The radio network node of claim 12, wherein the at least one quantized haptic experience indication comprises a first quantized haptic experience indication indicative of a first haptic experience that corresponds to the first extended reality appliance and a second quantized haptic experience indication indicative of a second haptic experience that corresponds to the second extended reality appliance, wherein the reactive traffic comprises first reactive traffic that corresponds to the first haptic experience and second reactive traffic that corresponds to the second haptic experience, and wherein the reactive traffic is not indicative of the first extended reality appliance or the second extended reality appliance.

14. The radio network node of claim 12, wherein the at least one quantized haptic experience indication comprises a first quantized haptic experience indication indicative of a first haptic experience that corresponds to the first extended reality appliance and a second quantized haptic experience indication indicative of a second haptic experience that corresponds to the second extended reality appliance, and wherein the first quantized haptic experience indication is not indicative of the first extended reality appliance and the second quantized haptic experience indication is not indicative of the second extended reality appliance.

15. The radio network node of claim 12, wherein the at least one quantized haptic experience indication is not indicative of the first extended reality appliance or the second extended reality appliance, wherein the reactive traffic comprises first reactive traffic that corresponds to a first haptic experience associated with the first extended reality appliance and second reactive traffic that corresponds to a second haptic experience associated with the second extended reality appliance, and wherein the reactive traffic is not indicative of the first extended reality appliance or the second extended reality appliance.

16. The radio network node of claim 12, wherein the operations further comprise:

transmitting, to extended reality server equipment, the extended reality application information; and responsive to transmitting the extended reality application information, receiving, from the extended reality server equipment, the haptic experience quantization configuration information.

17. The radio network node of claim 12, wherein the operations further comprise:

responsive to receiving the extended reality application information, directing, to an extended reality server, an extended reality application haptic experience information request comprising a request for extended reality application haptic experience information corresponding to the extended reality application; and responsive to the extended reality application haptic experience information request, receiving the extended reality application haptic experience information;

determining at least one quantization value corresponding to the extended reality application haptic experience information to result in at least one determined quantization value; and associating the at least one determined quantization value with the extended reality application haptic experience information to result in the haptic experience quantization configuration information.

18. A non-transitory machine-readable medium, comprising executable instructions that, when executed by at least one processor of radio network equipment, facilitate performance of operations, comprising:

receiving, from an extended reality processing unit, extended reality application information comprising an application indication indicative of an extended reality application with respect to which at least one extended reality appliance, communicatively coupled with the extended reality processing unit, is capable of using to facilitate an extended reality session with respect to core network equipment, associated with a core network, that is configured to facilitate the extended reality session;

responsive to receiving the extended reality application information, directing, to the core network equipment, an extended reality application haptic experience configuration information request comprising a request for extended reality application haptic experience configuration information corresponding to the extended reality application;

responsive to the extended reality application haptic experience configuration information request, receiving, from the core network equipment, the extended reality application haptic experience configuration information;

receiving, from the extended reality processing unit, a quantized haptic experience indication indicative of at least one haptic experience, indicated by the extended reality application haptic experience configuration information and corresponding to the at least one extended reality appliance;

receiving, from the core network equipment, reactive traffic corresponding to the at least one haptic experience indicated by the quantized haptic experience indication;

scheduling at least one downlink radio resource usable to facilitate delivery of the reactive traffic to the extended reality processing unit to result in at least one scheduled downlink radio resource; and transmitting, to the extended reality processing unit according to the at least one scheduled downlink radio resource, the reactive traffic.

19. The non-transitory machine-readable medium of claim 18, wherein the at least one extended reality appliance comprises a first extended reality appliance and a second extended reality appliance, wherein the quantized haptic experience indication comprises a first quantized haptic experience indication indicative of a first haptic experience that corresponds to the first extended reality appliance or a second quantized haptic experience indication indicative of a second haptic experience that corresponds to the second extended reality appliance, wherein the reactive traffic comprises first reactive traffic that corresponds to the first haptic experience or second reactive traffic that corresponds to the second haptic experience, wherein the reactive traffic is directed to the extended reality processing unit, and wherein the at least one scheduled downlink radio resource is not scheduled exclusively with respect to either the first reactive traffic or the second reactive traffic.

20. The non-transitory machine-readable medium of claim 18, wherein the at least one extended reality appliance comprises a first extended reality appliance and a second extended reality appliance, wherein the quantized haptic experience indication comprises a first quantized haptic experience indication indicative of a first haptic experience that corresponds to the first extended reality appliance or a second quantized haptic experience indication indicative of a second haptic experience that corresponds to the second extended reality appliance, wherein the first quantized haptic experience indication is not indicative of the first extended reality appliance and the second quantized haptic experience indication is not indicative of the second extended reality appliance, and wherein the at least one scheduled downlink radio resource is usable by the extended reality processing unit to receive traffic corresponding to the first extended reality appliance or the second extended reality appliance.

* * * * *